United States Patent
Park et al.

(10) Patent No.: US 12,444,373 B2
(45) Date of Patent: Oct. 14, 2025

(54) DISPLAY DEVICE

(71) Applicant: Samsung Display Co., LTD., Yongin-si (KR)

(72) Inventors: So Young Park, Yongin-si (KR); Soon Gyu Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/308,490

(22) Filed: Apr. 27, 2023

(65) Prior Publication Data
US 2024/0046887 A1 Feb. 8, 2024

(30) Foreign Application Priority Data

Aug. 2, 2022 (KR) .................. 10-2022-0096091

(51) Int. Cl.
*G09G 3/3291* (2016.01)
*G06F 3/041* (2006.01)

(52) U.S. Cl.
CPC ......... *G09G 3/3291* (2013.01); *G06F 3/0412* (2013.01); *G09G 2320/0247* (2013.01); *G09G 2360/145* (2013.01)

(58) Field of Classification Search
CPC ...... G06V 40/145; H04N 23/72; H04N 23/70; G06F 3/03; G06F 3/04162; G06F 3/0412; G06F 3/0442; G06F 3/0441; G06F 3/04184; G06F 3/041; F06F 3/04182; G06G 3/3291
See application file for complete search history.

(56) References Cited

U.S. PATENT DOCUMENTS

| | | | |
|---|---|---|---|
| 6,710,818 B1 * | 3/2004 | Kasahara | H04N 23/70 348/226.1 |
| 7,187,405 B2 * | 3/2007 | Poplin | H04N 23/745 348/226.1 |
| 7,411,615 B2 * | 8/2008 | Hashimoto | H04N 23/56 348/E5.029 |
| 9,288,404 B2 * | 3/2016 | Papiashvili | H04N 23/745 |
| 10,158,811 B2 * | 12/2018 | Ichikawa | H04N 1/409 |
| 10,572,085 B2 * | 2/2020 | Jung | G06V 40/1306 |
| 11,410,456 B2 * | 8/2022 | Lee | G09G 3/3208 |
| 11,423,691 B2 * | 8/2022 | Moon | G06V 40/1394 |
| 2004/0051791 A1 * | 3/2004 | Hashimoto | G06V 40/145 348/E5.029 |

(Continued)

*Primary Examiner* — Olga V Merkoulova
(74) *Attorney, Agent, or Firm* — Womble Bond Dickinson (US) LLP

(57) ABSTRACT

A display device includes: display pixels in a display area of a display panel; light-sensing pixels alternately arranged with the display pixels in the display area; a display scan driver configured to sequentially provide display scan signals to the display pixels through display scan lines; a flicker detection circuit configured to detect an occurrence of flicker in the display area by using light-sensing signals received from the light-sensing pixels; a touch sensing circuit configured to detect a touch from a user and coordinate data of a location of the touch via touch electrodes of a touch sensor; and a main driving circuit configured to maintain or change a driving mode of the touch sensor in units of at least one frame based on a flicker detection result and a flicker degree analysis result from the flicker detection circuit.

20 Claims, 19 Drawing Sheets

(56) References Cited

U.S. PATENT DOCUMENTS

| | | | | |
|---|---|---|---|---|
| 2004/0080630 | A1* | 4/2004 | Kim | H04N 23/745 |
| | | | | 348/226.1 |
| 2005/0238259 | A1* | 10/2005 | Kim | H04N 23/745 |
| | | | | 348/E5.037 |
| 2006/0221192 | A1* | 10/2006 | Nakajima | H04N 23/88 |
| | | | | 348/207.99 |
| 2015/0309658 | A1* | 10/2015 | Stevenson | G06F 3/0445 |
| | | | | 345/176 |
| 2017/0295329 | A1* | 10/2017 | Ichikawa | H04N 1/409 |
| 2019/0138123 | A1* | 5/2019 | Jung | G06F 3/0446 |
| 2021/0142029 | A1* | 5/2021 | Moon | G06V 40/1365 |
| 2021/0217358 | A1* | 7/2021 | Lee | G06V 40/1382 |
| 2021/0281783 | A1* | 9/2021 | Nam | H04N 25/772 |
| 2021/0397862 | A1* | 12/2021 | Lee | G09G 5/10 |
| 2022/0214795 | A1* | 7/2022 | Hisano | G06F 3/03 |

* cited by examiner

USP: SP1, SP2, SP3, LSP

DISPLAY DEVICE

CROSS-REFERENCE TO RELATED APPLICATION

The present application claims priority to and the benefit of Korean Patent Application No. 10-2022-0096091 filed on Aug. 2, 2022 in the Korean Intellectual Property Office, the entire content of which is incorporated herein by reference.

BACKGROUND

1. Field

Aspects of some embodiments of the present disclosure relate to a display device.

2. Description of the Related Art

As the information society has developed, the demand for display devices for displaying images has diversified. For example, display devices have been utilized in various electronic devices such as smart phones, digital cameras, notebook computers, navigation systems, and smart televisions.

Examples of display devices include flat panel display devices such as a liquid crystal display (LCD) device, a field emission display (FED) device, or an organic light-emitting diode (OLED) display device. The OLED display device, in particular, includes light-emitting elements, which can allow pixels of a display panel to emit light, and can thus display images without the aid of a backlight unit that provides light to the display panel.

A display device may include a touch sensing module for sensing touch from a user as an input interface. The touch sensing module may include a touch sensing unit in which touch electrodes are arranged and a touch driving circuit, which detects the amount by which capacitors between the touch electrodes are charged. The touch sensing module may be integrally formed with an image display unit of the display device or may be mounted at the front of the image display unit.

The above information disclosed in this Background section is only for enhancement of understanding of the background and therefore the information discussed in this Background section does not necessarily constitute prior art.

SUMMARY

Aspects of some embodiments of the present disclosure include a display device capable of detecting flicker in a displayed image with the use of light-sensing pixels in a display area and changing the driving mode of a touch sensing module depending on the occurrence and the degree of flicker in the displayed image.

However, aspects of some embodiments of the present disclosure are not restricted to those set forth herein. The above and other aspects of some embodiments of the present disclosure will become more apparent to one of ordinary skill in the art to which the present disclosure pertains by referencing the detailed description of the present disclosure given below.

According to some embodiments of the present disclosure, there is provided a display device comprising display pixels arranged in a display area of a display panel, light-sensing pixels alternately arranged with the display pixels in the display area, a display scan driving unit sequentially providing display scan signals to the display pixels through display scan lines, a flicker detection circuit detecting the occurrence of flicker in the display area by using light-sensing signals received from the light-sensing pixels, a touch sensing circuit detecting touch from a user and coordinate data of a location of the touch via touch electrodes of a touch sensing unit, and a main driving circuit either maintaining or changing a driving mode of the touch sensing unit in units of at least one frame based on a flicker detection result and a flicker degree analysis result from the flicker detection circuit.

According to some embodiments, the display pixels include light-emitting elements and pixel drivers, which are connected to the light-emitting elements, the light-sensing pixels include light-sensing elements and sensing drivers, which are connected to the light-sensing elements, and the sensing drivers receive the display scan signals at the same time through the display scan lines and outputs the light-sensing signals to the flicker detection circuit in accordance with the display scan signals.

According to some embodiments, the display pixels include light-emitting elements and pixel drivers, which are connected to the light-emitting elements, the light-sensing pixels include light-sensing elements and sensing drivers, which are connected to the light-sensing elements, and the sensing drivers are reset in response to sensing reset signals input thereto from the light-sensing scan driving unit through sensing reset lines, and output the light-sensing signals to the flicker detection circuit in response to sensing scan signals input thereto from the light-sensing scan driving unit.

According to some embodiments, red, green, and blue display pixels and one sensing pixel form a unit pixel in the display area and are alternately arranged in first and second directions in a horizontal or vertical stripe fashion.

According to some embodiments, the main driving circuit is switched to a flicker measurement mode through application control or programming control, and in the flicker measurement mode, the main driving circuit controls the driving of the display scan driving unit such that predefined data voltages are supplied to the display pixels for the detection of flicker, and provides a touch driving control signal to the touch sensing circuit such that the touch sensing unit is switched to a flicker detection mode.

According to some embodiments, the flicker detection circuit detects a light-sensing profile and a degree of flicker by analyzing light-sensing signals output from the light-sensing pixels, and the main driving circuit either maintains or shifts down the driving mode of the touch sensing unit depending on the degree of flicker, detected by the flicker detection circuit.

According to some embodiments, the flicker detection circuit generates the light-sensing profile in units of the at least one frame by sampling the light-sensing signals and converting the sampled light-sensing signals, and filters the light-sensing profile by comparing the light-sensing profile in units of the at least one frame or comparing the light-sensing profile with a predefined reference light-sensing profile.

According to some embodiments, when switched to the flicker measurement mode, the main driving circuit determines whether a moving or still image is being displayed by identifying digital video data regarding an image currently being displayed, and if a determination is made that a moving image is being displayed in the display area, the main driving circuit generates a gate control signal by lowering a frame driving frequency for displaying an image, provides the gate control signal to the display scan driving unit, and provides a touch driving control signal to the touch sensing circuit such that the touch sensing unit is switched to a flicker detection mode.

According to some embodiments, if a touch driving control signal corresponding to the flicker detection mode is input from the main driving circuit, the touch sensing circuit lowers the frame driving frequency from a first frequency to a second frequency to a third frequency in units of a predefined number of frames, changes the magnitude of a driving voltage to be applied to driving electrodes of the touch sensing unit, and supplies the driving voltage.

According to some embodiments, the flicker detection circuit generates a light-sensing profile in units of the at least one frame by sampling light-sensing signals input thereto in the flicker measurement mode and converting the sampled light-sensing signals into digital signals, filters the light-sensing profile by comparing the light-sensing profile on a frame-by-frame basis, and transmits data including a location and a degree of flicker to the main driving circuit through the analysis of variations in the magnitude of the light-sensing signals in the filtered light-sensing profile.

According to some embodiments, if larger magnitude variations than a predefined level are detected from the light-sensing signals in the light-sensing profile over a predefined period or area, the flicker detection circuit determines that a flicker phenomenon has occurred.

According to some embodiments, the flicker detection circuit obtains differential data by subtracting light-sensing data of a reference light-sensing profile from light-sensing data of light-sensing signals with flicker, and sets the differential data as a light-sensing profile.

According to some embodiments, if light-sensing signals in the light-sensing profile vary by more than a predefined level, the flicker detection circuit determines that a flicker phenomenon has occurred at a corresponding location or line area, and transmits code data indicating that flicker has occurred, coordinate data of a flicker-occurred area where the flicker has occurred, and numerical data indicating a degree of the flicker in the flicker-occurred area to the main driving circuit.

According to some embodiments, the flicker detection circuit generates a light-sensing profile in units of the at least one frame by sampling light-sensing signals input thereto in the flicker measurement mode and converting the sampled light-sensing signals into digital signals, filters the light-sensing profile by comparing the light-sensing profile with a predefined reference light-sensing profile, and transmits data including a location and a degree of flicker to the main driving circuit through the analysis of variations in the magnitude of the light-sensing signals in the filtered light-sensing profile.

According to some embodiments, if light-sensing signals in the light-sensing profile vary by more than a predefined level, the flicker detection circuit determines that a flicker phenomenon has occurred at a corresponding location or line area, and transmits code data indicating that flicker has occurred, coordinate data of a flicker-occurred area where the flicker has occurred, and numerical data indicating a degree of the flicker in the flicker-occurred area to the main driving circuit.

According to some embodiments, the flicker detection circuit obtains differential data between a plurality of light-sensing profiles with flicker by comparing and analyzing at least two of the plurality of light-sensing profiles, and sets the differential data as a light-sensing profile.

According to some embodiments, the flicker detection circuit obtains differential data between a plurality of light-sensing profiles of a plurality of frames with flicker by subtracting light-sensing data of a light-sensing profile of one of the plurality of frames from light-sensing data of a light-sensing profile of another one of the plurality of frames, and sets the differential data as a light-sensing profile.

According to some embodiments, if light-sensing signals in the light-sensing profile vary by more than a predefined level, the flicker detection circuit determines that a flicker phenomenon has occurred at a corresponding location or line area, and transmits code data indicating that flicker has occurred, coordinate data of a flicker-occurred area where the flicker has occurred, and numerical data indicating a degree of the flicker in the flicker-occurred area to the main driving circuit.

According to some embodiments, if the code data indicating that flicker has occurred, the coordinate data of the flicker-occurred area where the flicker has occurred, and the numerical data indicating the degree of the flicker in the flicker-occurred area are received, the main driving circuit generates a touch driving control signal shifting down the driving mode of the touch sensing unit, and provides the generated touch driving control signal to the touch sensing circuit.

According to some embodiments, if code data indicating that flicker has not occurred or numerical data indicating that flicker has occurred, but only to a normal degree, are received from the flicker detection circuit, the main driving circuit generates a touch driving control signal either maintaining or shifting up the driving mode of the touch sensing unit, and provides the generated touch driving control signal to the touch sensing circuit.

According to some embodiments of the present disclosure, the driving mode of a touch sensing module can be changed depending on the result of detection of flicker with the use of light-sensing pixels in a display area. Accordingly, when flicker does not occur, the driving mode of the touch sensing module can be maintained to prevent or reduce instances of the accuracy and efficiency of the detection of touch by the touch sensing module decreasing.

Also, the occurrence of flicker that may be caused by the driving of the touch sensing module can be prevented by selectively shifting down the driving mode of the touch sensing module based on the result of the detection of flicker.

It should be noted that the characteristics of embodiments of the present disclosure are not limited to those described above, and other characteristics of embodiments of the present disclosure will be apparent from the following description.

BRIEF DESCRIPTION OF THE DRAWINGS

The above and other aspects and features of the present disclosure will become more apparent by describing in more detail aspects of some embodiments thereof with reference to the attached drawings, in which.

DETAILED DESCRIPTION

Aspects of some embodiments of the present invention will now be described more fully hereinafter with reference to the accompanying drawings, in which aspects of some embodiments of the invention are shown. The present invention may, however, be embodied in different forms and should not be construed as limited to the embodiments set forth herein. Rather, these embodiments are provided so that this disclosure will be thorough and complete, and will more fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Aspects of some embodiments of the present disclosure will hereinafter be described in more detail with reference to the accompanying drawings.

Figure 1:
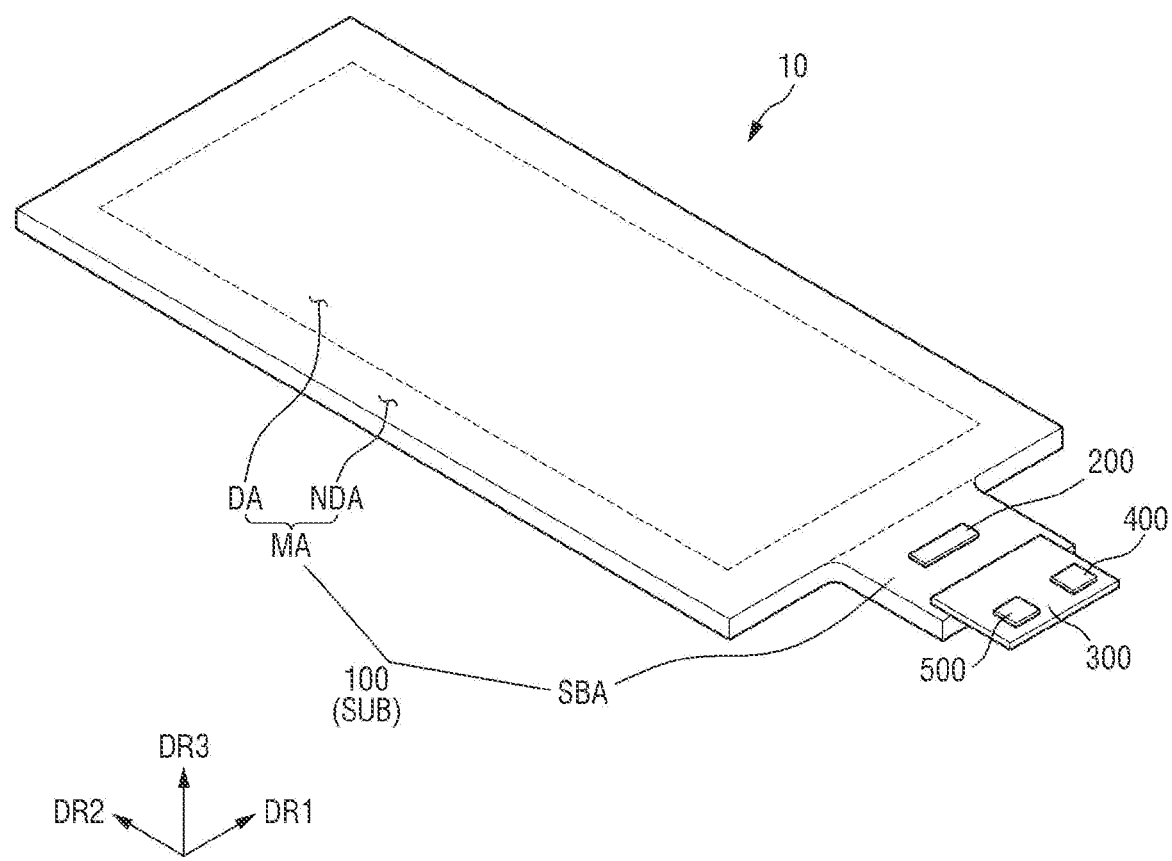
FIG. 1 is a perspective view of a display device according to some embodiments of the present disclosure.
Figure 2:
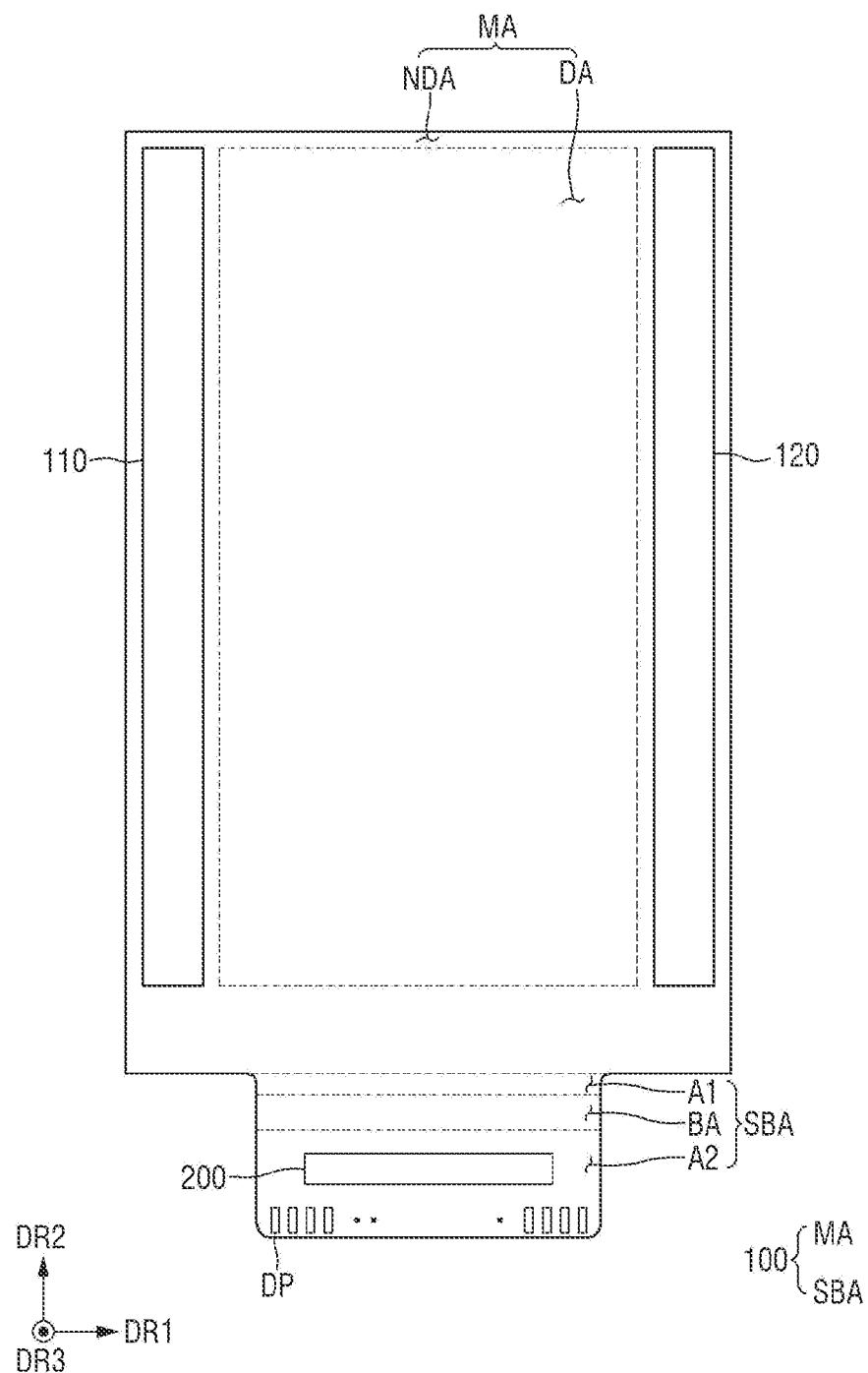
FIG. 2 is a plan view illustrating an layout of a display panel and a display driving circuit of FIG. 1 according to some embodiments of the present disclosure.

FIG. 1 is a perspective view of a display device according to some embodiments of the present disclosure. FIG. 2 is a layout view illustrating the layout of a display panel and a display driving circuit of FIG. 1 according to some embodiments of the present disclosure.

Referring to FIGS. 1 and 2, a display device 10 may be applicable to a portable electronic device such as a mobile phone, a smartphone, a tablet personal computer (PC), a mobile communication terminal, an electronic notepad, an electronic book (e-book), a portable multimedia player (PMP), a navigation device, or an ultra-mobile PC (UMPC). For example, the display device 10 may be used as the display unit of a television (TV), a laptop computer, a monitor, a billboard, or an Internet-of-Things (IoT) device, or any other suitable electronic device. In another example, the display device 10 may be applicable to a wearable device such as a smartwatch, a watchphone, a glasses display, or a head-mounted display (HMD). In another example, the display device 10 may be applicable to the instrument panel of an automobile, the center fascia of an automobile, a center information display (CID on the dashboard of an automobile, or an entertainment display located at the rear of a front seat of an automobile.

The display device 10 may be an organic light-emitting display device using organic light-emitting didoes (OLEDs), a quantum-dot light-emitting display device including a quantum-dot light-emitting layer, an inorganic light-emitting display device including an inorganic semiconductor, or a micro- or nano-light-emitting display device using micro- or nano-light-emitting diodes (micro- or nano-LEDs). The display device 10 will hereinafter be described as being an organic light-emitting display device, but embodiments according to the present disclosure are not limited thereto.

A display panel 100 may be formed in a rectangular shape having short sides in a first direction DR1 and long sides in a second direction DR2, in a plan view. The corners where the short sides and the long sides of the display panel 100 meet may be right-angled or may be rounded with a curvature (e.g., a set or predetermined curvature). The planar shape of the display panel 100 is not particularly limited. Alternatively, the display panel 100 may be formed in another polygonal shape, a circular shape, or an elliptical shape in a plan view. The display panel 100 may be formed to be flat, but embodiments according to the present disclosure are not limited thereto. Alternatively, the display panel 100 may include curved parts formed on both ends of the display panel 100 to have a uniform or varying curvature.

The display panel 100 may be formed to be flexible such as bendable, rollable, or foldable.

A substrate SUB of the display panel 100 may be divided into a main area MA and a subarea SBA.

The main area MA may be divided into a display area DA, which displays an image, and a non-display area NDA, which is around the display area DA.

The non-display area NDA may be located adjacent to the display area DA. The non-display area NDA may be an area outside the display area DA (e.g., outside a footprint or in a periphery of the display area DA). The non-display area NDA may be arranged to surround the display area DA. The non-display area NDA may correspond to the edges of the display panel 100.

The display area DA may include display pixels, which display an image, and light-sensing pixels, which sense light reflected from, for example, a protection cover or glass at the front of the display device 10 or a finger of a user. The display area DA may account for most of the main area MA. The display area DA may be located in the middle of the main area MA.

Figure 3:
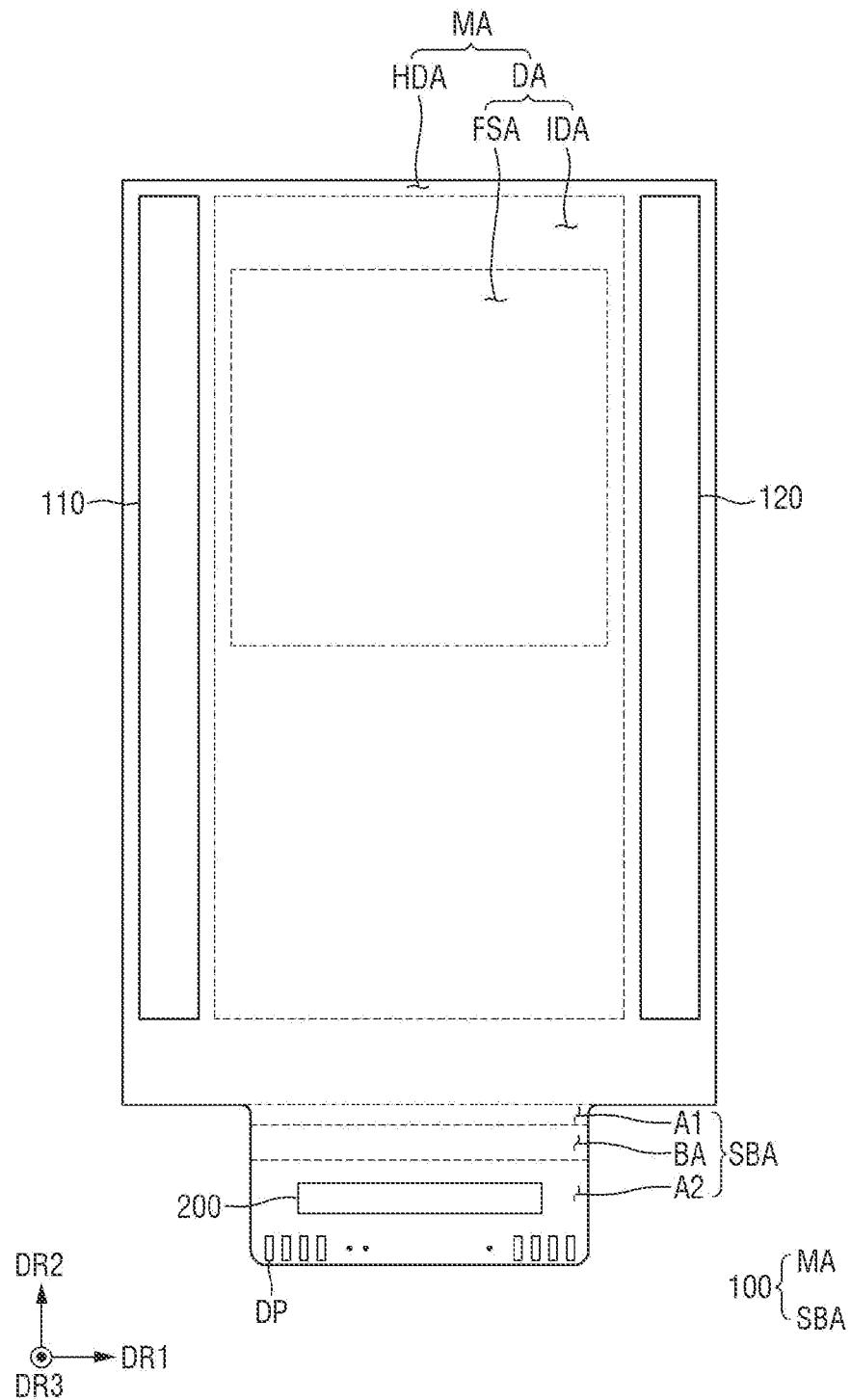
FIG. 3 is a plan view illustrating another layout of the display panel and the display driving circuit of FIG. 1 according to some embodiments of the present disclosure.
Figure 4:
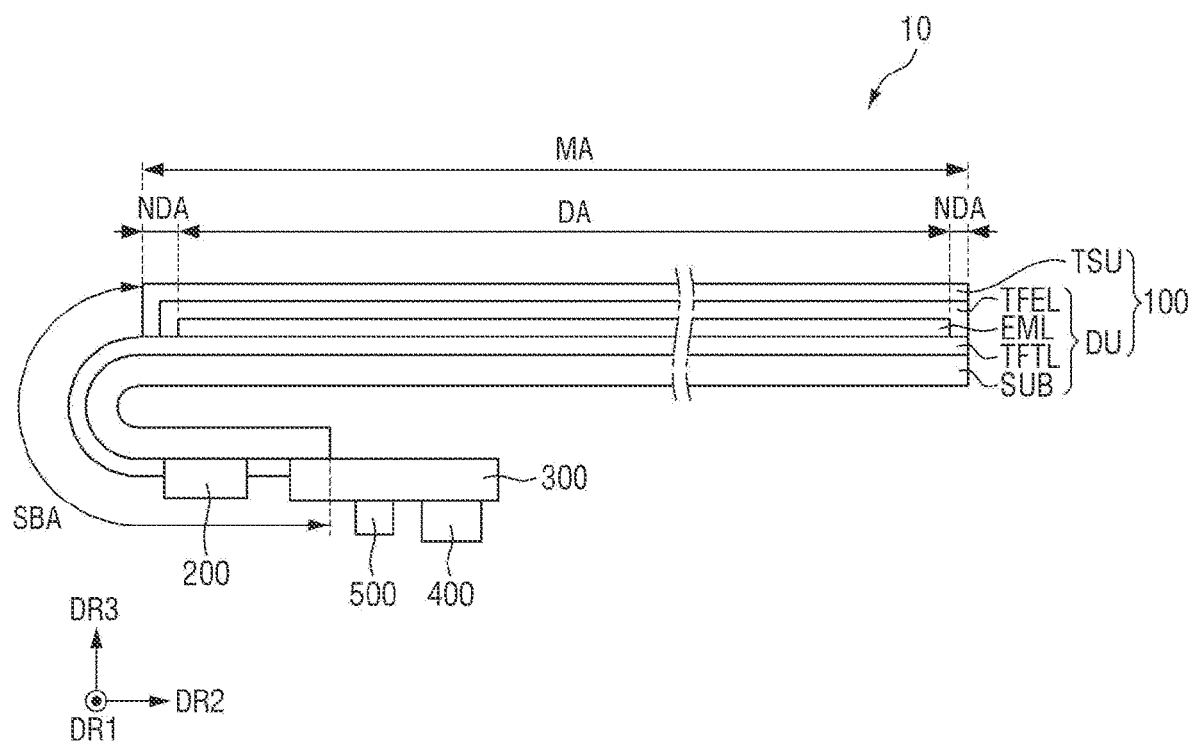
FIG. 4 is a side view of the display device of FIG. 1 according to some embodiments of the present disclosure.

FIG. 3 is a plan view illustrating another layout of the display panel and the display driving circuit of FIG. 1. FIG. 4 is a side view of the display device of FIG. 1.

Referring to FIG. 3, the display area DA may be divided into an image display area IDA, in which only display pixels are located, and a reflected light sensing area FSA, in which both display pixels and light-sensing pixels are located. In other words, light-sensing pixels may be located only in the reflected light sensing area FSA of the display area DA, rather than in the entire display area DA, together with display pixels. However, for convenience, an example in which display pixels and light-sensing pixels are alternately arranged in the entire display area DA will hereinafter be described.

The subarea SBA may protrude from one side, in the second direction DR2, of the main area MA. The length, in the second direction DR2, of the subarea SBA may be less than the length, in the second direction DR2, of the main area MA. The length, in the first direction DR1, of the subarea SBA may be substantially the same as, or less than, the length, in the first direction DR1, of the main area MA.

The subarea SBA may include a first area A1, a second area A2, and a bending area BA.

The first area A1 may be part of the subarea A1 that protrudes in the second direction DR2 from one side of the main area MA. One side of the first area A1 may adjoin the non-display area NDA of the main area MA, and the other side of the first area A1 may adjoin the bending area BA.

The second area A2 may be an area where pads DP and a main driving circuit 200 are located. The main driving circuit 200 may be attached to driving pads of the second area A2 via conductive adhesive members. A circuit board 300 may be attached to the pads DP of the second area A2 via conductive adhesive members.

One side of the second area A2 may adjoin the bending area BA. The bending area BA is a bendable part of the display device 10. When the bending area BA is bent, the second area A2 may be positioned below the first area A1 and the main area MA. The bending area BA may be located between the first and second areas A1 and A2. One side of the bending area BA may adjoin the first area A1, and the other side of the bending area BA may adjoin the second area A2.

Referring to FIG. 4, the subarea SBA may be bendable, and when the subarea SBA is bent, the subarea SBA may be positioned below the main area MA. The subarea SBA may overlap with the main area MA in a third direction DR3.

A touch sensing unit (or touch sensor) TSU, which senses the location of touch from a body part such as a finger, may be located at the front of the display panel 100, which includes the display area DA. The touch sensing unit TSU may include a plurality of touch electrodes and may detect the user's touch in a capacitive manner.

The touch sensing unit TSU includes a plurality of touch electrodes, which are arranged to intersect one another in the first and second directions DR1 and DR2. For example, the touch electrodes may be formed to extend in wiring areas (or parts of the non-display area NDA where wiring is formed), between the display pixels and the light-sensing pixels, and not to overlap with the display pixels and the light-sensing pixels. The touch electrodes form mutual capacitances and transmit touch sensing signals that vary depending on the user's touch to a touch sensing circuit 500.

The touch sensing circuit 500 may detect variations in mutual capacitances between the touch electrodes from the touch electrodes and may provide touch data corresponding to the variations in the mutual capacitances and coordinate data corresponding to the location where touch is detected to the main driving circuit 200.

The circuit board 300 may be attached to one end of the subarea SBA. The touch sensing circuit 500 may be mounted on the circuit board 300 and may be electrically connected to the touch electrodes of the touch sensing unit TSU. Also, the circuit board 300 may be electrically connected to the display panel 100 and the main driving circuit 200. The display panel 100 and the main driving circuit 200 may receive digital video data, timing signals, and driving voltages through the circuit board 300. The circuit board 300 may be a flexible printed circuit board (FPCB), a printed circuit board (PCB), or a flexible film such as a chip-on-film (COF).

The main driving circuit 200 may generate digital data and electrical control signals for driving the display panel 100. The main driving circuit 200, a flicker detection circuit 400, and the touch sensing circuit 500 may be formed as integrated circuits (ICs). The main driving circuit 200, the flicker detection circuit 400, and the touch sensing circuit 500 may be attached onto the display panel 100 or the circuit board 300 in a chip-on-glass (COG) or chip-on-plastic (COP) manner or via ultrasonic bonding, but embodiments according to the present disclosure are not limited thereto. Alternatively, the main driving circuit 200, the flicker detection circuit 400, and the touch sensing circuit 500 may be attached onto the circuit board 300 in a COF manner.

Figure 5:
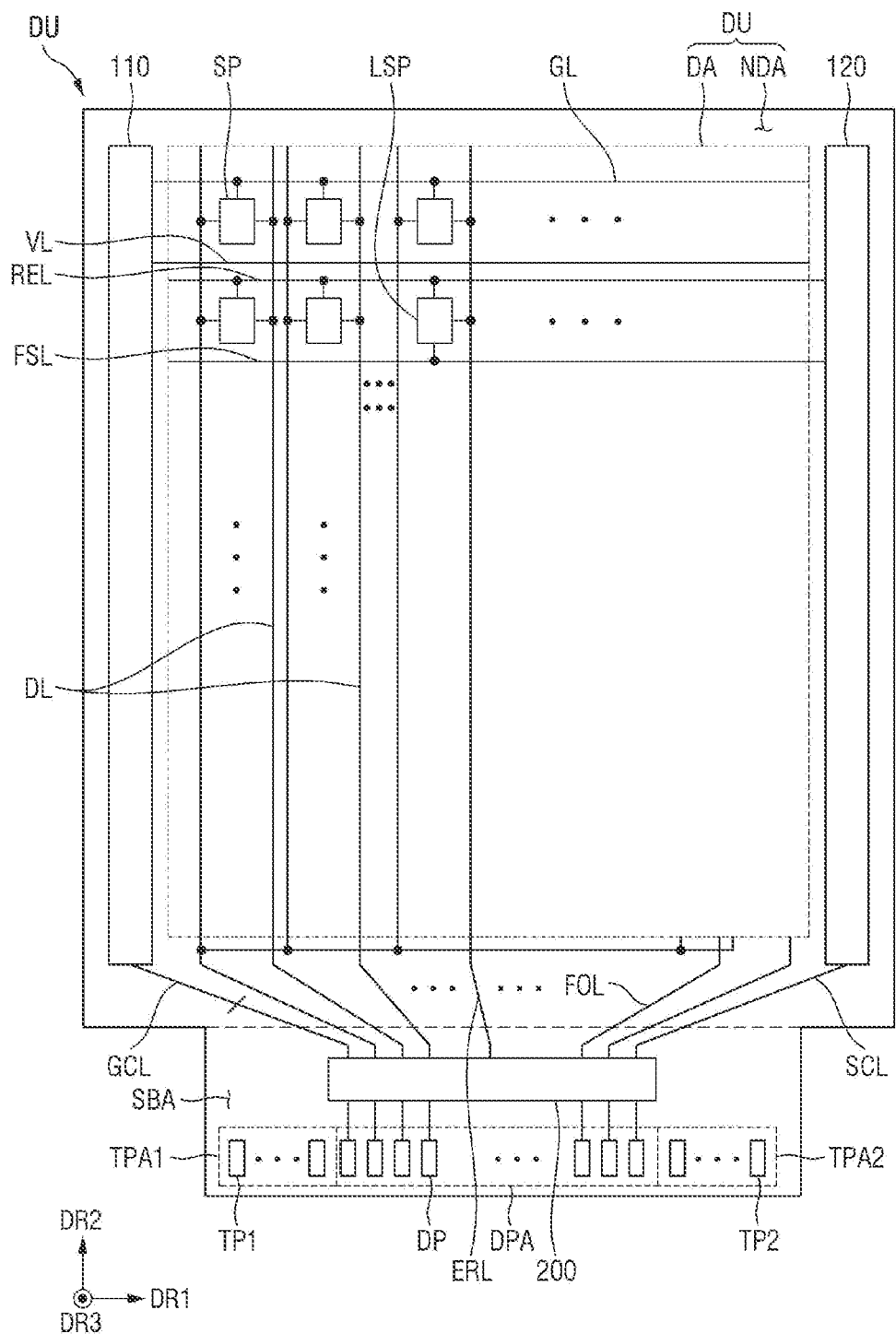
FIG. 5 is a layout view of the display panel of FIGS. 1 through 4 according to some embodiments of the present disclosure.

FIG. 5 is a layout view of the display panel of FIGS. 1 through 4. For example, FIG. 5 is a layout view illustrating a display area DA and a non-display area NDA of a display module DU when the touch sensing unit TSU is yet to be formed.

Referring to FIGS. 4 and 5, a display scan driving unit (or display scan driver or display scan driving circuit or display scan driving com 110, a light-sensing scan driving unit 120, and the main driving circuit 200 may be located on the display panel 100 of the display device 10. The flicker detection circuit 400, the touch sensing circuit 500, and a power supply unit (or power supply) may be located on the circuit board 300, which is connected to the display panel 100. The main driving circuit 200, the flicker detection circuit 400, and the touch sensing circuit 500 may all be integrally formed as one chip and may then be mounted on the display panel 100 or the circuit board 300. For convenience, the main driving circuit 200, the flicker detection circuit 400, and the touch sensing circuit 500 will hereinafter be described as being formed as different ICs.

Referring to FIG. 5, the display panel 100 may include display pixels SP, light-sensing pixels LSP, display scan lines GL, emission control lines VL, data lines DL, sensing scan lines FSL, sensing reset lines REL, and light-sensing lines ERL, which are all located in the display area DA. The display scan driving unit 110 and the light-sensing scan driving unit 120 may be located in the non-display area NDA.

The display scan lines GL may sequentially provide display scan signals, which are applied from the display scan driving units 110 in units of horizontal lines, to a number of display pixels SP corresponding to each of the horizontal lines. The display scan lines GL may extend in the first direction DR1 and may be spaced apart from one another in the second direction DR2, which intersects the first direction DR1.

The emission control lines VL may sequentially provide emission control signals, which are applied from the display scan driving unit 110 in units of the horizontal lines, to the display pixels SP corresponding to each of the horizontal lines. The emission control lines VL may extend in the first direction DR1 in parallel to the display scan lines GL and may be spaced apart from one another in the second direction DR2, which intersects the first direction DR1.

The data lines DL may provide data voltages received from the main driving circuit 200 to the display pixels SP. The data lines DL may extend in the second direction DR2 and may be spaced apart from one another in the first direction DR1.

The light-sensing scan lines FSL may sequentially provide sensing scan signals, which are applied from the light-sensing scan driving unit 120 in units of the horizontal lines, to the light-sensing pixels LSP. The light-sensing scan lines FSL may extend in the first direction DR1 and may be spaced apart from one another in the second direction DR2, which intersects the first direction DR1.

The sensing reset lines REL may sequentially provide sensing reset signals, which are applied from the light-sensing scan driving unit 120 in units of the horizontal lines, to a number of light-sensing pixels LSP corresponding to each of the horizontal lines. The sensing reset lines REL may extend in the first direction DR1 and may be spaced apart from one another in the second direction DR2, which intersects the first direction DR1.

The light-sensing lines ERL are connected between the flicker detection circuit 400 and the light-sensing pixels LSP and provide light-sensing signals output from the light-sensing pixels LSP to the flicker detection circuit 400. The light-sensing lines ERL may be arranged along, and extend in, the second direction DR2 depending on the layout of the flicker detection circuit 400 and may be spaced apart from one another in the first direction DR1.

The non-display area NDA may surround the display area DA. The non-display area NDA may include the display scan driving unit 110, the light-sensing scan driving unit 120, fan-out lines FOL, gate control lines GCL, and sensing control lines SCL.

The display pixels SP and the light-sensing pixels LSP may be arranged in a matrix in the first and second directions DR1 and DR2. For example, three display pixels SP, i.e., red, green, and blue display pixels SP displaying red light, green light, and blue light, respectively, and one light-sensing pixel LSP may form a unit pixel. The red, green, and blue display pixels SP and the light-sensing pixel LSP may be alternately arranged to form horizontal or vertical stripes.

Each of the red, green, and blue display pixels SP may be connected to one of the display scan lines GL and one of the emission control lines VL. Each of the display pixels SP may receive a data voltage from one of the data lines DL in accordance with a display scan signal from one of the display scan lines GL and an emission control signal from one of the emission control lines VL, and may provide a driving current to a light-emitting element and may thus emit light in accordance with the received data voltage.

The display pixels SP and the light-sensing pixels LSP may be alternately arranged in a vertical or horizontal direction. Each of the light-sensing pixels LSP may be connected to one of the light-sensing scan lines FSL, one of the sensing reset lines REL, and one of the light-sensing lines ERL. Each of the light-sensing pixels LSP may be reset in response to a sensing reset signal from one of the sensing reset lines REL, may generate a light-sensing signal corresponding to the amount of reflected light incident thereupon in a forward direction, and may transmit the light-sensing signal to one of the light-sensing lines ERL in response to a sensing scan signal from one of the light-sensing scan lines FSL.

Alternatively, the light-sensing pixels LSP may be connected to one of the display scan lines GL in units of the horizontal lines. Each of the light-sensing pixels LSP may generate a light-sensing signal corresponding to the amount of reflected light incident thereupon in the forward direction and may output the light-sensing signal to one of the light-sensing lines ERL in response to a display scan signal input thereto via one of the display scan lines GL.

The display scan driving unit 110 may be located in the non-display area NDA. The display scan driving unit 110 may be located on one side (e.g., on the left side) of the display panel 100, but the present disclosure is not limited thereto. Alternatively, the display scan driving unit 110 may be located on both sides (e.g., on the left and right sides) of the display panel 100.

The display scan driving unit 110 may be electrically connected to the main driving circuit 200 through the gate control lines GCL. The display scan driving unit 110 may receive scan control signals from the main driving circuit 200, may sequentially generate display scan signals in accordance with the scan control signals, and may sequentially provide the display scan signals to the display scan lines GL in units of horizontal line driving periods. Also, the display scan driving unit 110 may sequentially generate emission control signals and may sequentially provide the emission control signals to the emission control lines VL in accordance with the scan control signals received from the main driving circuit 200.

The gate control lines GCL may extend from the main driving circuit 200 to the display scan driving unit 110, depending on the location of the display scan driving unit 110. The gate control lines GCL may provide the scan control signals received from the main driving circuit 200 to the display scan driving unit 110.

The light-sensing scan driving unit 120 may be located in a different part of the non-display area NDA from the display scan driving unit 110. FIG. 5 illustrates that the light-sensing scan driving unit 120 is located on the other side (e.g., on the right side) of the display panel 100, but the present disclosure is not limited thereto. The light-sensing scan driving unit 120 may be electrically connected to the main driving circuit 200 through the light-sensing control lines SCL. The light-sensing scan driving unit 120 may receive a light-sensing control signal from the main driving circuit 200 and may sequentially generate reset control signals and sensing scan signals in units of the horizontal line driving periods, in accordance with the light-sensing control signal. The light-sensing scan driving unit 120 may sequentially provide the reset control signals to the sensing reset lines REL. Also, the light-sensing scan driving unit 120 may sequentially generate sensing scan signals in accordance with the light-sensing control signal received from the main driving circuit 200 and may sequentially provide the sensing scan signals to the sensing scan lines FSL.

The light-sensing control lines SCL may extend from the main driving circuit 200 to the light-sensing scan driving unit 120, depending on the location of the light-sensing scan driving unit 120. The light-sensing control lines SCL may provide the light-sensing control signal received from the main driving circuit 200 to the light-sensing scan driving unit 120.

The subarea SBA may include the main driving circuit 200, a display pad area DPA, a first touch pad area TPA1, and a second touch pad area TPA2. The display pad area DPA, the first touch pad area TPA1, and the second touch pad area TPA2 may be arranged along an edge of the subarea SBA. The display pad area DPA, the first touch pad area TPA1, and the second touch pad area TPA2 may be electrically connected to the circuit board 300 via a low-resistance, high-reliability member such as an anisotropic conductive film (ACF) or a self-assembly anisotropic conductive paste (SAP).

The fan-out lines FOL may extend from the main driving circuit 200 to the display area DA. Also, the fan-out lines FOL are connected such that data voltages received from the main driving circuit 200 may be provided to the data lines DL.

The main driving circuit 200 may output signals and voltages for driving the display panel 100 to the fan-out lines FOL. The main driving circuit 200 may provide data voltages to the data lines DL through the fan-out lines FOL. The data voltages may be provided to the display pixels SP and may determine the luminance of the display pixels SP. The main driving circuit 200 may provide the scan control signals to the display scan driving unit 110 through the gate control lines GCL.

The main driving circuit 200 may generate digital video data based on touch coordinate data received from the touch sensing circuit 500 or may execute an application pointed to by an icon at touch coordinates corresponding to the received touch coordinate data. For example, the main driving circuit 200 may be switched to a flicker measurement mode through application control or programming control (e.g., set or predetermined programming control) and may then function and operate in accordance with the flicker measurement mode.

In the flicker measurement mode, the main driving circuit 200 may control the display scan driving unit 110 and the light-sensing scan driving unit 120 by providing a gate control signal and the light-sensing control signal to the display scan driving unit 110 and the light-sensing scan driving unit 120, respectively. The main driving circuit 200 may provide data voltages for at least one frame to the data lines DL based on video data set in advance for the detection of flicker. The main driving circuit 200 may provide a touch driving control signal to the touch sensing circuit 500 such that the driving mode of the touch sensing unit TSU may be switched for the detection of flicker. Then, the light-sensing pixels LSP may be driven by the display scan driving unit 110 or the light-sensing scan driving unit 120, and light-sensing signals from the light-sensing pixels LSP may be output to the flicker detection circuit 400.

The flicker detection circuit 400 may detect a light-sensing profile and the occurrence of flicker by analyzing light-sensing signals output from the light-sensing pixels LSP. Accordingly, the main driving circuit 200 may maintain or shift down the driving mode of the touch sensing unit TSU depending on the occurrence and the degree of flicker in the display area DA. Also, the main driving circuit 200 may display, in the display area DA, flicker detection result information such as the occurrence and the degree of flicker in the display area DA.

The flicker detection circuit 400 may receive light-sensing signals input thereto through at least one of the light-sensing lines ERL. The flicker detection circuit 400 may generate a light-sensing profile in units of one or more frames by sampling the received light-sensing signals and converting the sampled light-sensing signals into digital signals.

The flicker detection circuit 400 may filter the generated light-sensing profile by comparing the generated light-sensing profile on a frame-by-frame basis or comparing the generated light-sensing profile with a reference light-sensing profile. Then, the flicker detection circuit 400 may detect the occurrence of flicker by analyzing magnitude variations in the filtered light-sensing profile and may detect the location and the degree of the flicker by analyzing the profile of the flicker. It will be described later how the flicker detection circuit 400 detects flicker and analyzes the degree of the flicker.

Figure 6:
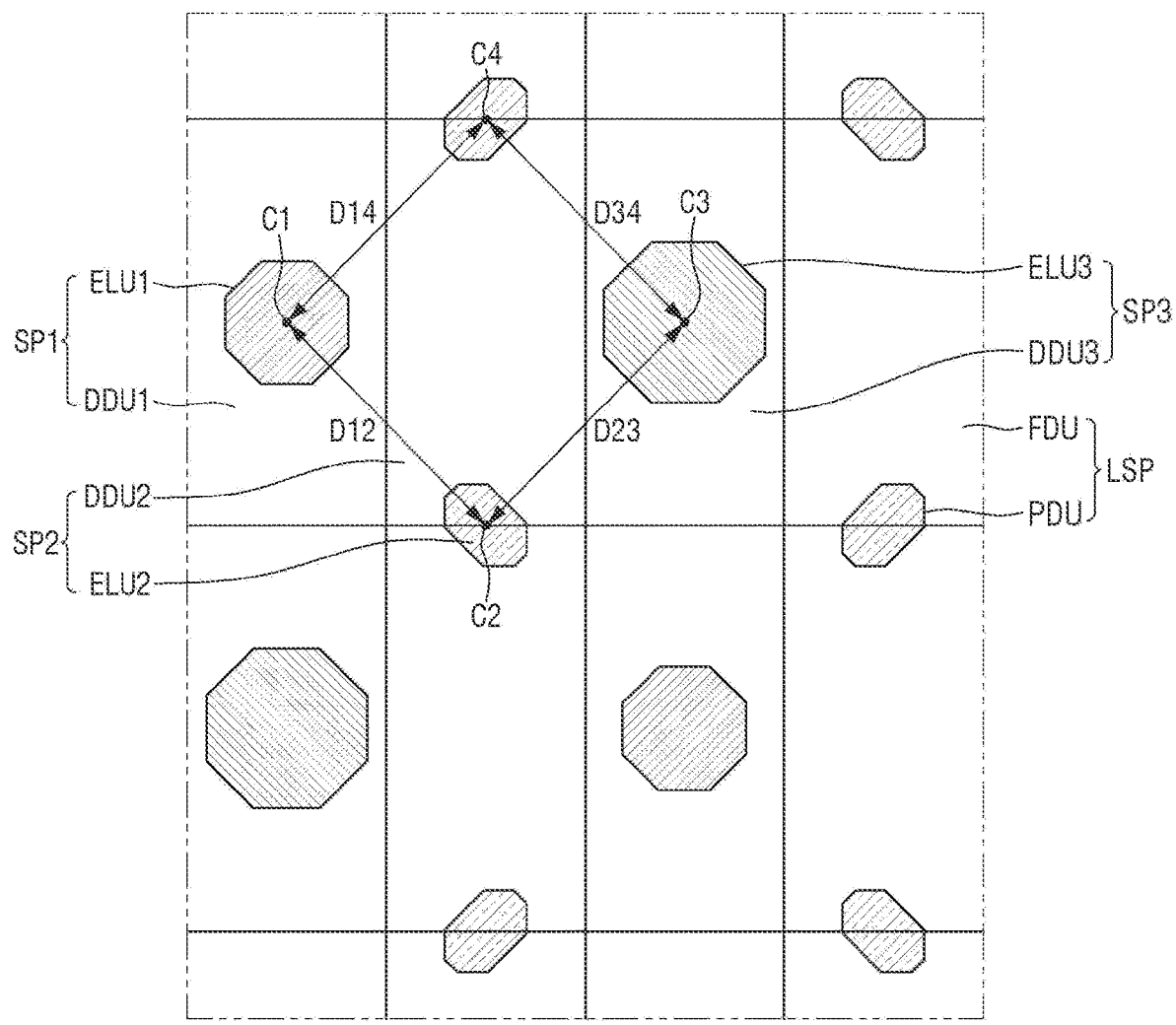
FIG. 6 is a layout view of a display area of the display device of FIG. 1 according to some embodiments of the present disclosure.

FIG. 6 is a layout view of a display area of the display device of FIG. 1.

Referring to FIG. 6, the display area DA may include display pixels SP, i.e., first display pixels SP1, second display pixels SP2, and third display pixels SP3, and light-sensing pixels LSP. The display pixels SP may be divided into the first display pixels SP1, the second display pixels SP2, and the third display pixels SP3. The first display pixels SP1, the second display pixels SP2, the third display pixels SP3, and the light-sensing pixels LSP may define unit display pixels USP. The unit display pixels USP may be defined as minimal display pixels capable of displaying white light and sensing light.

The first display pixels SP1 may include first light emitters ELU1, which emit first light, and first pixel drivers DDU1, which are for applying a driving current to light-emitting elements of the first light emitters ELU1. The first light may be red-wavelength light. For example, the first light may have a main peak wavelength of about 600 nm to 750 nm.

The second display pixels SP2 may include second light emitters ELU2, which emit second light, and second pixel drivers DDU2, which are for applying a driving current to light-emitting elements of the second light emitters ELU2. The second light may be green-wavelength light. For example, the second light may have a main peak wavelength of about 480 nm to 560 nm.

The third display pixels SP3 may include third light emitters ELU3, which emit third light, and third pixel drivers DDU3, which are for applying a driving current to light-emitting elements of the third light emitters ELU3. The third light may be blue-wavelength light. For example, the third light may have a main peak wavelength of about 370 nm to 460 nm.

The light-sensing pixels LSP may include light sensors PDU and sensing drivers FDU.

In each of the unit display pixels USP, first, second, and third pixel drivers DDU1, DDU2, and DDU3 and a sensing driver FDU may be sequentially arranged along the first direction DR1. First pixel drivers DDU1 that are adjacent to one another in the direction of the data lines DL may be arranged along the second direction DR2. Second pixel drivers DDU2 that are adjacent to one another in the direction of the data lines DL may be arranged along the second direction DR2. Similarly, sensing drivers FDU that are adjacent to one another in the direction of the data lines DL may be arranged along the second direction DR2.

The first light emitters ELU1 may overlap with the first pixel drivers DDU1, and the third light emitters ELU3 may overlap with the third pixel drivers DDU3. The second light emitters ELU2 and the light sensors PDU may overlap with the second pixel drivers DDU2 and the sensing drivers FDU, respectively. The second light emitters ELU2 and the light sensors PDU may be located at boundaries of the second pixel drivers DDU and the sensing drivers FDU, respectively.

The first light emitters ELU1, the second light emitters ELU2, the third light emitters ELU3, and the light sensors PDU may have an octagonal shape in a plan view, but the present disclosure is not limited thereto. Alternatively, the first light emitters ELU1, the second light emitters ELU2, the third light emitters ELU3, and the light sensors PDU may have a rectangular shape such as a rhombus shape or may have another polygonal shape.

A distance D12 between centers C1 of the first light emitters ELU1 and centers C2 of the second light emitters ELU2, a distance D23 between the centers C2 of the second light emitters ELU2 and centers C3 of the third light emitters ELU3, a distance D14 between the centers C1 of the first light emitters ELU1 and centers C4 of the light sensors PDU, and a distance D34 between the centers C3 of the third light emitters ELU3 and the centers C4 of the light sensors PDU may all be substantially the same.

Figure 7:
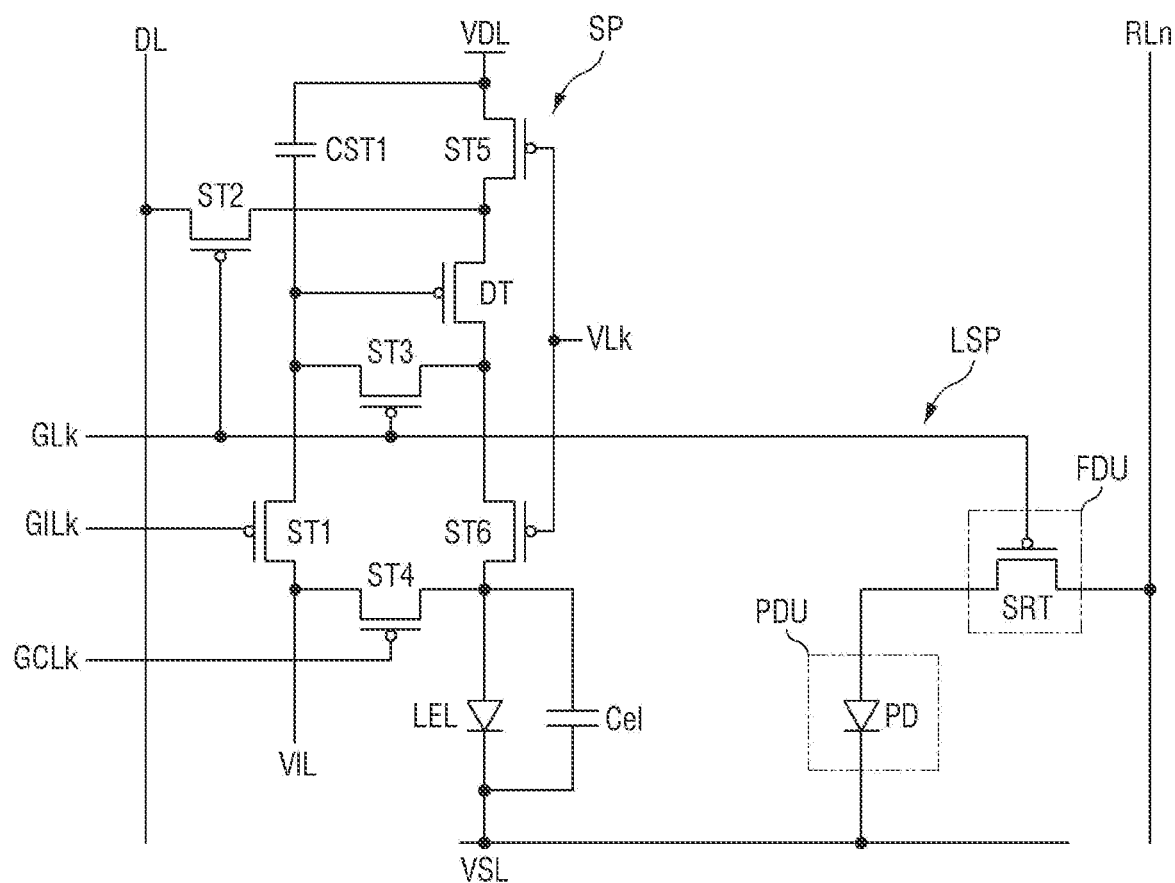
FIG. 7 is a circuit diagram illustrating an display pixel and an light-sensing pixel of the display device of FIG. 1 according to some embodiments of the present disclosure.

FIG. 7 is a circuit diagram illustrating an display pixel and an light-sensing pixel of the display device of FIG. 1.

Referring to FIG. 7, a display pixel SP may be connected to a k-th display initialization line GILk, a k-th display scan line GLk, a k-th display control line GCLk, and a k-th emission control line VLk (where k is a positive integer and is not zero). The display pixel SP may also be connected to a first driving voltage line VDL, to which a first driving voltage is supplied, a second driving voltage line VSL, to which a second driving voltage is supplied, and a third driving voltage line VIL, to which a third driving voltage is supplied.

The display pixel SP may include a light emitter ELU and a pixel driver DDU. The light emitter ELU may include a light-emitting element LEL. The pixel driver DDU includes a driving transistor DT, switching elements, and a capacitor CST1. The switching elements include first, second, third, fourth, fifth, and sixth transistors ST1, ST2, ST3, ST4, ST5, and ST6.

The driving transistor DT may include a gate electrode, a first electrode, and a second electrode. The driving transistor DT controls a drain-source current or a driving current Ids in accordance with a data voltage applied to its gate electrode. The driving current Ids, which flows through a channel of the driving transistor DT, may be proportional to the square of the difference between a threshold voltage Vth and a voltage Vgs, which is the voltage between the gate electrode and the first electrode of the driving transistor DT, as indicated by Equation (1):

$$Ids = k' \times (Vgs - |Vth|)^2 \quad (1)$$

where k' is a proportionality coefficient determined by the structure and physical characteristics of the driving transistor DT, Vgs is the voltage between the gate electrode and the first electrode of driving transistor DT, and Vth is the threshold voltage of the driving transistor DT.

The light-emitting element LEL emits light in accordance with the driving current Ids. The amount of light emitted by the light-emitting element LEL may increase in proportion to the driving current Ids.

The light-emitting element LEL may be an organic LED (OLED) including an organic light-emitting layer between an anode and a cathode. Alternatively, the light-emitting element LEL may be an inorganic LED including an inorganic semiconductor between an anode and a cathode. Still alternatively, the light-emitting element LEL may be a quantum-dot LED including a quantum-dot light-emitting layer between an anode and a cathode. Yet alternatively, the light-emitting element LEL may be a micro-light-emitting element including a microLED between an anode and a cathode.

The anode of the light-emitting element LEL may be connected to a first electrode of the fourth transistor ST4 and a second electrode of the sixth transistor ST6, and the cathode of the light-emitting element LEL may be connected to the second driving line VSL. A parasitic capacitor Cel may be formed between the anode and the cathode of the light-emitting element LEL.

The first transistor ST1 is turned on by an initialization scan signal from the k-th display initialization line GILk to connect the gate electrode of the driving transistor DT to the third driving voltage line VIL. As a result, the third driving voltage VINT from the third driving voltage line VIL may be applied to the gate electrode of the driving transistor DT. A gate electrode of the first transistor ST1 may be connected to the k-th display initialization line GILk, a first electrode of the first transistor ST1 may be connected to the gate electrode of the driving transistor DT, and a second electrode of the first transistor ST1 may be connected to the third driving voltage line VIL.

The second transistor ST2 is turned on by the display scan signal from the k-th display scan line GLk to connect the first electrode of the driving transistor DT to a data line DL. As a result, a data voltage from the data line DL may be applied to the first electrode of the driving transistor DT. A gate electrode of the second transistor ST2 may be connected to the k-th display scan line GLk, a first electrode of the second transistor ST2 may be connected to the first electrode of the driving transistor DT, and a second electrode of the second transistor ST2 may be connected to the data line DL.

The third transistor ST3 is turned on by the display scan signal from the k-th display scan line GLk to connect the gate electrode and the second electrode of the driving transistor DT. When the gate electrode and the second electrode of the driving transistor DT are connected, the driving transistor DT may function as a diode. A gate electrode of the third transistor ST3 may be connected to the k-th display scan line GLk, a first electrode of the third transistor ST3 may be connected to the second electrode of the driving transistor DT, and a second electrode of the third transistor ST3 may be connected to the gate electrode of the driving transistor DT.

The fourth transistor ST4 is turned on by the display control signal from the k-th display control line GCLk to connect the anode of the light-emitting element LEL to the third driving voltage line VIL. The third driving voltage from the third driving voltage line VIL may be applied to the anode of the light-emitting element LEL. A gate electrode of the fourth transistor ST4 may be connected to the k-th display control line GCLk, a first electrode of the fourth transistor ST4 may be connected to the anode of the light-emitting element LEL, and a second electrode of the fourth transistor ST4 may be connected to the third driving voltage line VIL.

The fifth transistor ST5 is turned on by an emission signal from the k-th emission control line VLk to connect the first electrode of the driving transistor DT to the first driving voltage line VDL. A gate electrode of the fifth transistor ST5 may be connected to the k-th emission control line VLk, a first electrode of the fifth transistor ST5 may be connected to the first driving voltage line VDL, and a second electrode of the fifth transistor ST5 may be connected to the first electrode of the driving transistor DT.

The sixth transistor ST6 is located between the second electrode of the driving transistor DT and the anode of the light-emitting element LEL. The sixth transistor ST6 is turned on by an emission control signal from the k-th emission control line VLk to connect the second electrode of the driving transistor DT to the anode of the light-emitting element LEL. A gate electrode of the sixth transistor ST6 may be connected to the k-th emission control line VLk, a first electrode of the sixth transistor ST6 may be connected to the second electrode of the driving transistor DT, and a second electrode of the sixth transistor ST6 may be connected to the anode of the light-emitting element LEL.

When the fifth and sixth transistors ST5 and ST6 are both turned on, the driving current Ids of the driving transistor DT may flow into the light-emitting element LEL in accordance with the data voltage applied to the gate electrode of the driving transistor DT.

The capacitor CST1 is formed between the gate electrode of the driving transistor DT and the first driving voltage line VDL. A first electrode of the capacitor CST1 may be connected to the gate electrode of the driving transistor DT, and a second electrode of the capacitor CST1 may be connected to the first driving voltage line VDL.

If the first electrodes of the first, second, third, fourth, fifth, and sixth transistors ST1, ST2, ST3, ST4, ST5, and ST6 and the first electrode of the driving transistor DT are source electrodes, the second electrodes of the first, second, third, fourth, fifth, and sixth transistors ST1, ST2, ST3, ST4, ST5, and ST6 and the second electrode of the driving transistor DT may be drain electrodes. Alternatively, if the first electrodes of the first, second, third, fourth, fifth, and sixth transistors ST1, ST2, ST3, ST4, ST5, and ST6 and the first electrode of the driving transistor DT are drain electrodes, the second electrodes of the first, second, third, fourth, fifth, and sixth transistors ST1, ST2, ST3, ST4, ST5, and ST6 and the second electrode of the driving transistor DT may be source electrodes.

The active layers of the first, second, third, fourth, fifth, and sixth transistors ST1, ST2, ST3, ST4, ST5, and ST6 and the active layer of the driving transistor DT may be formed of one of polysilicon, amorphous silicon, and an oxide semiconductor. FIG. 7 illustrates that the first, second, third, fourth, fifth, and sixth transistors ST1, ST2, ST3, ST4, ST5, and ST6 and the driving transistor DT are formed as P-type metal-oxide semiconductor field-effect transistors (MOSFETs), but the present disclosure is not limited thereto. Alternatively, the first, second, third, fourth, fifth, and sixth transistors ST1, ST2, ST3, ST4, ST5, and ST6 and the driving transistor DT may be formed as N-type MOSFETs. Yet alternatively, at least one of the first, second, third, fourth, fifth, or sixth transistors ST1, ST2, ST3, ST4, ST5, or ST6 and the driving transistor DT may be formed as an N-type MOSFET.

A light-sensing pixel LSP may be connected to the k-th display scan line GLk and an n-th sensing line RLn (where n is a positive integer and is not zero).

The light-sensing pixel LSP may include alight sensor PDU and a sensing driver FDU. The light sensor PDU may include a light-sensing element PD. The sensing driver FDU may include a sensing signal transistor SRT.

The voltage of an anode of the light-sensing element PD may vary depending on the amount of light incident upon the light sensing element PD. For example, the greater the amount of light incident upon the light-sensing element PD, the higher the voltage of the sensing anode of the light-sensing element PD.

The light-sensing element PD may be a photodiode including an anode, a PIN semiconductor layer, and a cathode. The anode of the light-sensing element PD may be connected to a first electrode of the sensing signal transistor SRT, and a cathode of the light-sensing element PD may be connected to the second driving voltage line VSL. The PIN semiconductor layer of the light-sensing element PD may include a P-type semiconductor layer, which is connected to the anode of the light-sensing element PD, an N-type semiconductor layer, which is connected to the cathode of the light-sensing element PD, and an I-type semiconductor layer, which is located between the P-type semiconductor layer and the N-type semiconductor layer. In this case, as the I-type semiconductor layer is depleted by the P- and N-type semiconductor layers, an electric field may be generated, and holes and electrons generated by light may be drifted by the electric field. As a result, the holes may be collected by the anode of the light-sensing element PD through the P-type semiconductor layer, and the electrons may be collected by the cathode of the light-sensing element PD through the N-type semiconductor layer.

The sensing signal transistor SRT is turned on by the display scan signal from the k-th display scan line GLk to connect the anode of the light-sensing element PD to the n-th light-sensing line RLn. As a result, the voltage of the anode of the light-sensing element PD may be applied to the n-th light-sensing line RLn. A gate electrode of the sensing signal transistor SRT may be connected to the k-th display scan line GLk, a first electrode of the sensing signal transistor SRT may be connected to the anode of the light-sensing element PD, and a second electrode of the sensing signal transistor SRT may be connected to the n-th light-sensing line RLn.

Figure 8:
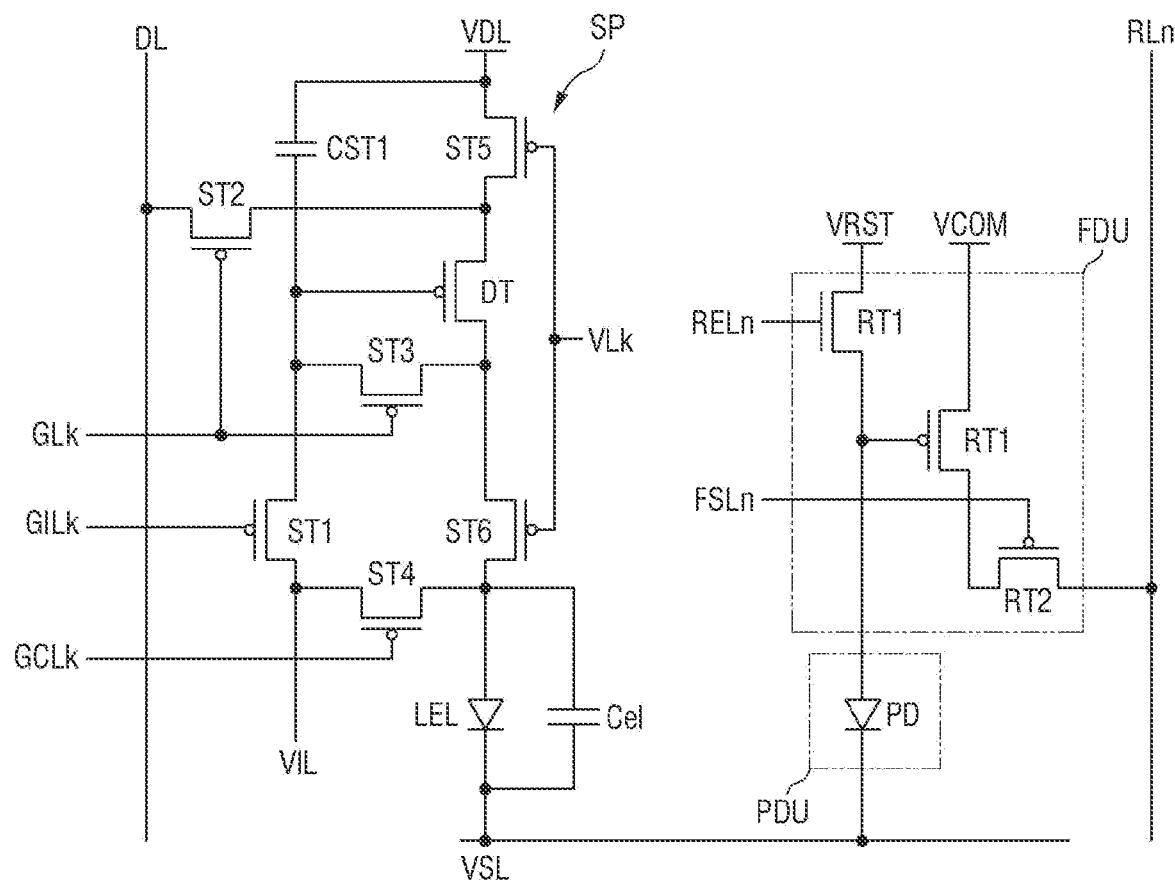
FIG. 8 is a circuit diagram illustrating another display pixel and another light-sensing pixel of the display device of FIG. 1 according to some embodiments of the present disclosure.

FIG. 8 is a circuit diagram illustrating another display pixel and another light-sensing pixel of the display device of FIG. 1.

Referring to FIG. 8, a light-sensing pixel LSP, which is arranged in the display area DA together with display pixels SP, may be electrically connected to an n-th sensing reset line RSLn (where n is a positive integer and is not zero), an n-th light-sensing scan line FSLn, and n-th light sensing line RLn. The light-sensing pixel LSP may be reset by a reset signal from the n-th sensing reset line RSLn and may transmit a light-sensing signal to the n-th light-sensing line RLn in response to a sensing scan signal from the n-th light-sensing scan line FSLn.

As illustrated in FIG. 8, the light-sensing pixel LSP may include a light sensor PDU, which includes a light-sensing element PD, and a sensing driver FDU, which includes first, second, and third sensing transistors RT1, RT2, and RT3 and a sensing capacitor. Here, the sensing capacitor may be formed in parallel with the light-sensing element PD.

The first sensing transistor RT1 of the sensing driver FDU may flow a light-sensing current in accordance with the voltages of the light-sensing element PD and the sensing capacitor. The amount of light-sensing current may vary depending on the voltages applied to the light-sensing element PD and the sensing capacitor. A gate electrode of the first sensing transistor RT1 may be connected to a second electrode of the light-sensing element PD. A first electrode of the first sensing transistor RT1 may be connected to a common voltage source VCOM, to which a common voltage is applied. A second electrode of the first sensing transistor RT1 may be connected to a first electrode of the second sensing transistor RT2.

When a sensing scan signal having a gate-on voltage is applied to the n-th light-sensing scan line FSLn, the second sensing transistor RT2 may flow a sensing current from the first sensing transistor RT1 into the n-th light-sensing line RLn. In this case, the n-th light-sensing line RLn may be charged with a sensing voltage by the sensing current. A gate electrode of the second sensing transistor RT2 may be connected to the n-th light-sensing scan line FSLn, the first electrode of the second sensing transistor RT2 may be connected to the second electrode of the first sensing transistor RT1, and a second electrode of the second sensing transistor RT2 may be connected to the n-th light-sensing line RLn.

When a reset signal having the gate-on voltage is applied to the n-th sensing reset line RSLn, the third sensing transistor RT3 may reset the voltages of the light-sensing element PD and the sensing capacitor to as low as a reset voltage from a reset voltage source VRST. A gate electrode of the third sensing transistor RT3 may be connected to the sensing reset line RSL, a first electrode of the third sensing transistor RT3 may be connected to the reset voltage source VRST, and a second electrode of the third sensing transistor RT3 may be connected to the second electrode of the light-sensing element PD.

FIG. 8 illustrates that the first and second sensing transistors RT1 and RT2 are formed as P-type MOSFETs and the third sensing transistor RT3 is formed as an N-type MOSFET, but the present disclosure is not limited thereto. Alternatively, the first, second, and third sensing transistors RT1, RT2, and RT3 may all be selectively formed as sensing transistors of the same type or of different types. One of the first and second electrodes of each of the first, second, and third sensing transistors RT1, RT2, and RT3 may be a source electrode, and the other electrode of each of the first, second, and third sensing transistors RT1, RT2, and RT3 may be a drain electrode.

Figure 9:
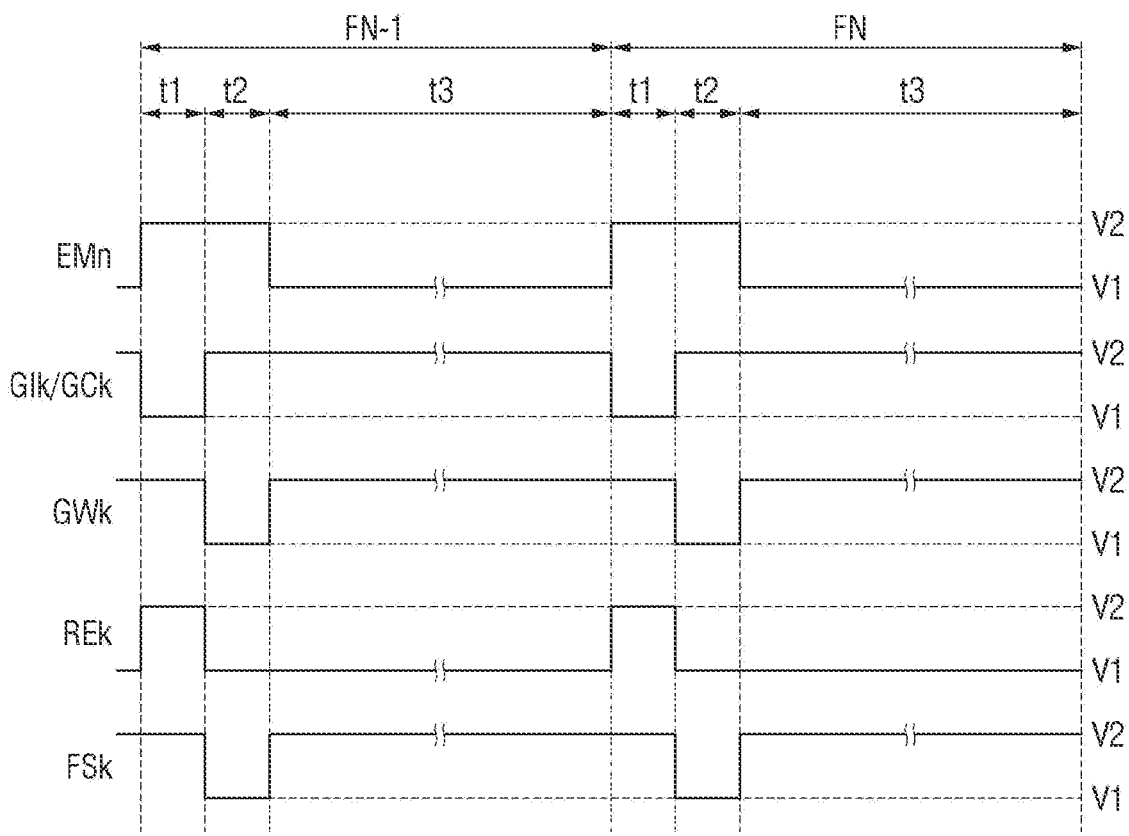
FIG. 9 is a waveform diagram showing scan signals input to the display pixel and the light-sensing pixel of FIG. 8 according to some embodiments of the present disclosure.

FIG. 9 is a waveform diagram showing scan signals input to the display pixel and the light-sensing pixel of FIG. 8.

FIG. 9 shows a k-th emission control signal EMk, which is applied to the n-th emission control line VLn during (N−1)-th and N-th frame periods FN-1 and FN, a k-th display initialization signal GI, which is applied to the k-th display initialization line GILk, a k-th display control signal GCk, which is applied to the k-th display control line GCLk, a k-th display scan signal GWk, which is applied to the k-th display scan line GLk, a k-th sensing reset signal REk, which is applied to the k-th sensing reset line RSLk, and a k-th sensing scan signal FSk, which is applied to the k-th light-sensing scan line FSLk.

The k-th display initialization signal GIk and the k-th display control signal GCk, like the k-th emission control signal EMk and the k-th display scan signal GWk, may be sequentially generated and output by the display scan driving unit 110 in units of horizontal line driving periods.

The k-th sensing reset signal REk, which is applied to the k-th sensing reset line RSLk, is a signal for controlling the turning on or off of the third sensing transistor RT3, and the k-th sensing scan signal FSk, which is applied to the k-th light-sensing scan line FSLk, is a signal for turning on or off of the second sensing transistor RT2.

The k-th sensing reset signal REk may be generated to have a second-level voltage V2 during a first period t1 and to have a first-level voltage V1 during second and third periods t2 and t3. The k-th sensing scan signal FSk may be generated to have the first-level voltage V1 during the first period t1 and to have the second-level voltage V2 during the second and third periods t2 and t3. The k-th sensing scan signal FSk may be applied at the same timing as the k-th display scan signal GWk.

During the first period t1, a k-th sensing reset signal REk having the second-level voltage V2 is applied to the gate electrode of the third sensing transistor RT3. As a result, the third sensing transistor RT3 is turned on by the k-th sensing reset signal REk having the second-level voltage V2 to reset the second electrode of the light-sensing element PD to the reset voltage source VRST. On the contrary, a k-th sensing scan signal having the first-level voltage V1 is applied to the gate electrode of the second sensing transistor RT2. The second sensing transistor RT2 is turned off by the k-th sensing scan signal FSk having the first-level voltage V1.

During the second and third periods t2 and t3, the k-th sensing reset signal REk having the first-level voltage V1 is applied to the gate electrode of the third sensing transistor RT3. As a result, the third sensing transistor RT3 maintains to be turned off. On the contrary, during the second period t2, the k-th sensing scan signal FSk having the second-level voltage V2 is applied to the gate electrode of the second sensing transistor RT2. As a result, during the second period t2, the second sensing transistor RT2 may be turned on, and during the second and third periods t2 and t3, the first sensing transistor RT1 may be turned off. During the third period t3, the voltage of the anode of the light-sensing element PD may increase depending on the amount of light incident thereupon from the front of the display device 10.

Figure 10:
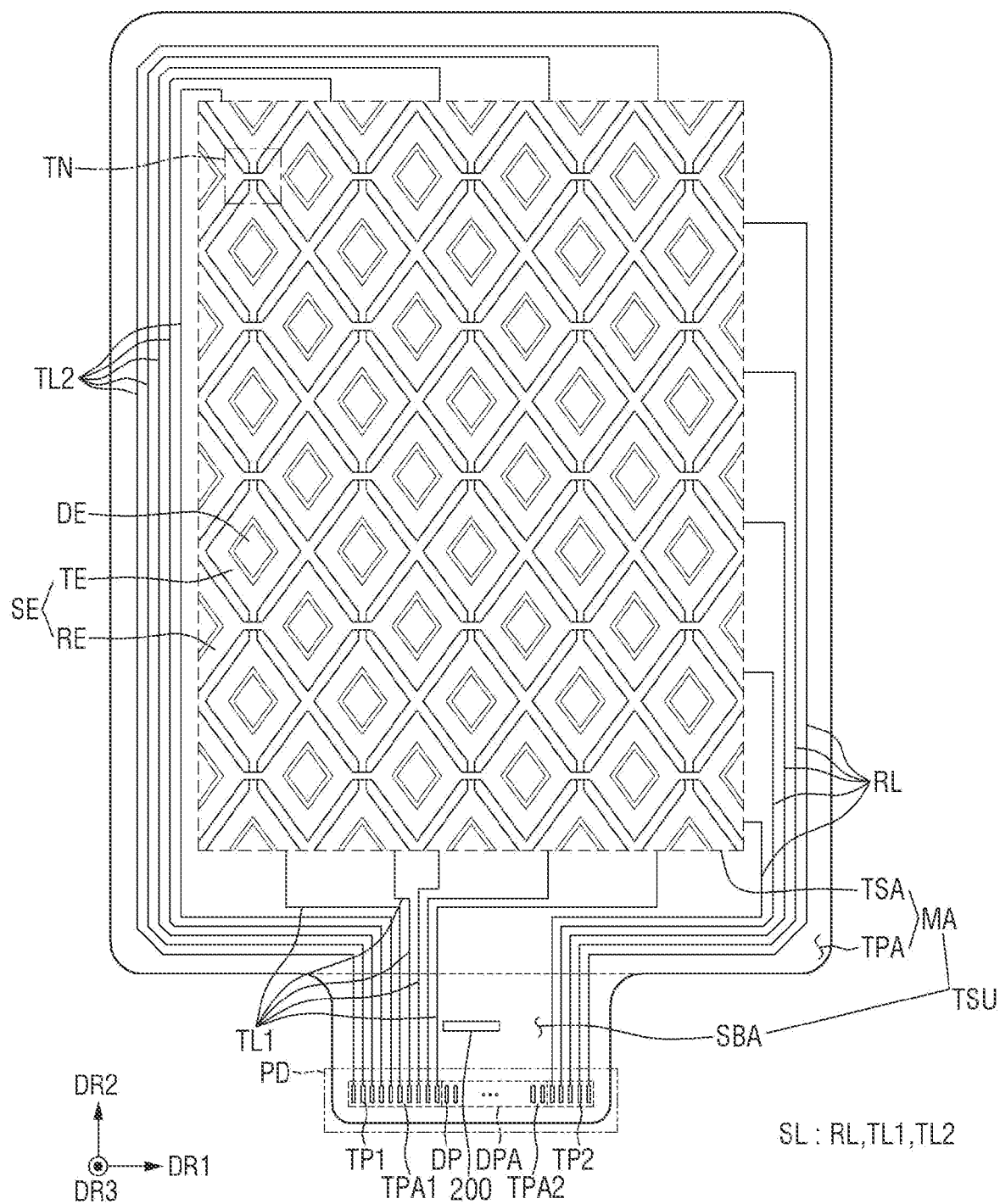
FIG. 10 is a layout view of a touch sensing unit of FIG. 4 according to some embodiments of the present disclosure.

FIG. 10 is a layout view of the touch sensing unit of FIG. 4.

FIG. 10 illustrates that the main area MA includes two types of touch electrodes SE, i.e., driving electrodes TE and sensing electrodes RE, and the touch electrodes SE are driven in a mutual capacitance manner by applying touch driving signals to the driving electrodes TE and detecting mutual capacitance variations from a plurality of touch nodes via the sensing electrodes RE, but the present disclosure is not limited thereto.

For convenience, FIG. 10 illustrates only the driving electrodes TE, the sensing electrodes RE, dummy patterns DE, touch lines SL, test signal transmission lines CL, first touch pads TP1, and second touch pads TP2.

Referring to FIG. 10, the main area MA of the touch sensing unit TSU may include a touch sensing area TSA, which is for sensing touch from the user, and a touch peripheral area TPA, which is around the touch sensing area TSA. The touch sensing area TSA may overlap with the display area DA of FIGS. 1 through 3, and the touch peripheral area TPA may overlap with the non-display area NDA.

The driving electrodes TE, the sensing electrodes RE, and the dummy patterns DE are located in the touch sensing area TSA. The driving electrodes TE and the sensing electrodes RE may be electrodes for forming mutual capacitances to detect touch from an object or the user.

The sensing electrodes RE may be arranged in parallel in the first and second directions DR1 and DR2. The sensing electrodes RE may be electrically connected to one another in the first direction DR1. Sensing electrodes RE that are adjacent to one another in the first direction DR1 may be connected to one another. Sensing electrodes RE that are adjacent to one another in the second direction DR2 may be electrically isolated from one another. Accordingly, the touch nodes TN where mutual capacitances are formed may be located at the intersections between the driving electrodes TE and the sensing electrodes RE. The touch nodes TN may correspond to the intersections between the driving electrodes TE and the sensing electrodes RE.

The driving electrodes TE may be arranged in parallel in the first and second directions DR1 and DR2. Driving electrodes TE that are adjacent to one another in the first direction DR1 may be electrically isolated from one another. Driving electrodes TE that are adjacent to one another in the second direction DR2 may be electrically connected to one another. The driving electrodes TE that are adjacent to one another in the second direction DR2 may be connected to one another via connecting electrodes.

The dummy patterns DE may be arranged to be surrounded by the driving electrodes TE or the sensing electrodes RE. The dummy patterns DE may be electrically isolated from the driving electrodes TE or the sensing electrodes RE. The dummy patterns DE may be spaced apart from the driving electrodes TE or the sensing electrodes RE. The dummy patterns DE may be electrically floated.

FIG. 10 illustrates that the driving electrodes TE, the sensing electrodes RE, and the dummy patterns DE have a rhombus shape in a plan view, but the present disclosure is not limited thereto. Alternatively, the driving electrodes TE, the sensing electrodes RE, and the dummy patterns DE may have a rectangular shape other than a rhombus shape, another polygonal shape, a circular shape, or an elliptical shape in a plan view.

The touch lines SL may be located in the touch peripheral area TPA. The touch lines SL include first touch driving lines TL1 and second touch driving lines TL2, which are both connected to the driving electrodes TE, and touch sensing lines RL, which are connected to the sensing electrodes RE.

Sensing electrodes RE at one end of the touch sensing area TSA may be connected one-to-one to the touch sensing lines RL. For example, sensing electrodes RE at the right end of the touch sensing area TSA that are electrically connected to one another in the first direction DR1 may be connected to the touch sensing lines RL.

The touch sensing lines RL may be connected one-to-one to the second touch pads TP2 in a pad unit FD ( 도면에 "PD" 로 기재됨).

Driving electrodes TE at one end of the touch sensing area TSA may be connected one-to-one to the firs touch driving lines TL1, and driving electrodes TE at the other end of the touch sensing area TSA may be connected one-to-one to the second touch driving lines TL2. For example, driving electrodes TE at the lower end of the touch sensing area TSA may be connected one-to-one to the first touch driving line TL1, and driving electrodes TE at the upper end of the touch sensing area TSA may be connected one-to-one to the second touch driving lines TL2. The second touch driving lines TL2 may be connected to the driving electrodes TE at the upper side of the touch sensing area TSA through the outer left side of the touch sensing area TSA.

The first touch driving lines TL1 and the second touch driving lines TL2 may be connected one-to-one to the first touch pads TP1 in the pad unit FD. The driving electrodes TE may be connected to the first touch driving lines TL1 and the second touch driving lines TL2, on both sides of the touch sensing area TSA, and may thus receive touch driving signals. Accordingly, differences that may arise between touch driving signals applied to the driving electrodes TE on the lower side of the touch sensing area TSA and the driving electrodes TE on the upper side of the touch sensing area TSA due to RC delays can be prevented.

Figure 11:
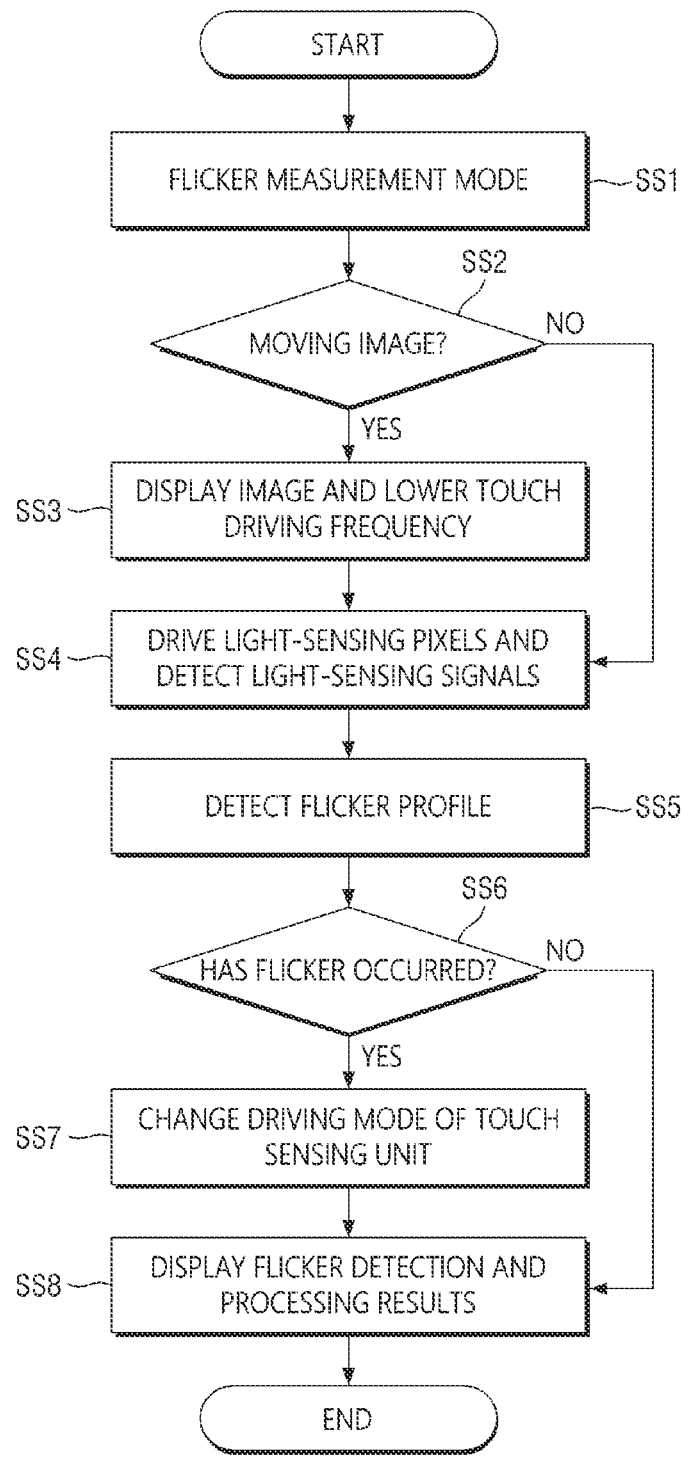
FIG. 11 is a flowchart illustrating an operation of a main driving circuit of FIGS. 1 and 4 according to some embodiments of the present disclosure.

FIG. 11 is a flowchart illustrating an operation of the main driving circuit of FIGS. 1 and 4.

Referring to FIG. 11, the main driving circuit 200 may be switched to the flicker measurement mode through application control or programming control and may perform a function and operation corresponding to the flicker measurement mode (SS1).

In the flicker measurement mode, the main driving circuit 200 identifies digital video data for an image currently being displayed and determines whether a moving image or a still image is being displayed (SS2).

When a moving image is being displayed in the display area DA, the main driving circuit 200 generates a gate control signal and a light-sensing control signal by lowering the frame driving frequency for displaying an image. The lower the frame driving frequency for displaying an image, the higher the accuracy of the detection of flicker. Thereafter, the main driving circuit 200 provides a touch driving control signal to the touch sensing circuit 500 such that the touch sensing unit TSU is switched to the flicker detection mode (SS3).

TABLE 1

|  | Driving Voltage | Driving Frequency | Upline Zone | Sensing Period (Timing) |
| --- | --- | --- | --- | --- |
| First Driving Mode | 5 V (H), 0 V (L) | 120 Hz | Narrow | N Frames |
| Second Driving Mode | 8 V (H), 0 V (L) | 240 Hz | Wide | 2N Frames |
| Third Driving Mode | 8 V (H), 0 V (L) | 60 Hz, 120 Hz, 240 Hz | Wide | 3N Frames |
| SCS Mode | 5 V (H), 0 V (L) | 240 Hz | Wide | N Frames |

As shown in Table 1 above, when a moving image is being displayed in the flicker measurement mode, the main driving circuit 200 may provide a touch driving control signal to the touch sensing circuit 500 such that the touch sensing unit TSU may be switched from a first driving mode to a third driving mode.

For example, the main driving circuit 200 may generate a third driving mode control signal and may transmit the third driving mode control signal to the touch sensing circuit 500 such that the driving frequency and the driving voltage of the touch sensing unit TSU may both be lowered. Accordingly, the touch sensing circuit 500 may drive the touch electrodes SE of the touch sensing unit TSU by lowering the driving frequency and the driving voltage of the touch sensing unit TSU in response to the third driving mode control signals.

In another example, the main driving circuit 200 may generate a third driving mode control signal and may transmit the third driving mode control signal to the touch sensing circuit 500 such that the driving frequency of the touch sensing unit TSU may be lowered, but the driving voltage of the touch sensing unit TSU may be raised. Accordingly, the touch sensing circuit 500 may drive the touch electrodes SE of the touch sensing unit TSU by lowering the driving frequency of the touch sensing unit TSU and raising the driving voltage of the touch sensing unit TSU in response to the third driving mode control signals.

The third driving mode control signal may be a control signal set in advance to drive the touch sensing unit TSU in the flicker detection mode.

Before the flicker measurement mode, the touch sensing circuit 500 may control the touch sensing unit TSU to be driven in a first driving mode where a touch driving voltage of 5 V is supplied to the driving electrodes TE at a driving frequency of 120 Hz. During the first driving mode, a first area, which is relatively narrow, may be set as an upline zone, which is the touch sensing area TSA, and a touch sensing period may be set to N frames. Alternatively, the touch sensing circuit 500 may control the touch sensing unit TSU to be driven in a second driving mode where a touch driving voltage of 8 V is supplied to the driving electrodes TE at a driving frequency of 240 Hz. During the second driving mode, a second area, which is wider than the first area, may be set as the upline zone, and the touch sensing period may be set to 2N Frames.

In response to the third driving mode control signal being input from the main driving circuit 200, the touch sensing circuit 500 may drive the touch sensing unit TSU in the third driving mode. That is, the touch sensing circuit 500 may lower the driving frequency to, for example, 60 Hz, in units of a number of frames (e.g., a set or predefined number of frames), and may supply a touch driving voltage of 5 V or 8 V to the driving electrodes TE. During the third driving mode, the second area, which is wider than the first area, may be set as the upline zone, and the touch sensing period may be set to 3N frames.

Referring again to FIG. 11, the main driving circuit 200 may generate a gate control signal and a light-sensing control signal in accordance with a lowered driving frequency and may provide the gate control signal and the light-sensing control signal to the display scan driving unit 110 and the light-sensing scan driving unit 120, respectively. For the detection of flicker, the main driving circuit 200 also supply data voltages for at least one frame to the data lines DL in accordance with video data (e.g., set or predefined video data). As a result, the display scan driving unit 110 and the light-sensing scan driving unit 120 display a moving image at the lowered driving frequency in response to the data voltages (SS4).

As a moving image can be displayed in the display area DA at the lowered driving frequency, i.e., at a high-speed frame frequency, control signals and data voltages applied to the display area DA can be less affected by touch driving signals for the touch sensing unit TSU. The less the interference in control signals and driving voltages for the display area DA and the touch sensing unit TSU of the display panel 100 and in data voltages, the higher the accuracy of the detection of flicker.

The flicker detection circuit 400 generates a light-sensing profile in units of one or more frames by sampling light-sensing signals input thereto via the light-sensing lines ERL and converting the sampled light-sensing signals into digital signals. Then, the flicker detection circuit 400 may filter the generated light-sensing profile by comparing the generated light-sensing profile on a frame-by-frame basis or comparing the generated light-sensing profile with a reference light-sensing profile. Then, the flicker detection circuit 400 detects the occurrence of flicker by analyzing the filtered light-sensing profile, detects the location and the degree of the flicker by analyzing the profile of the flicker, and transmits the results of the detection, i.e., flicker detection result data, to the main driving circuit 200 (SS5).

Figure 12:
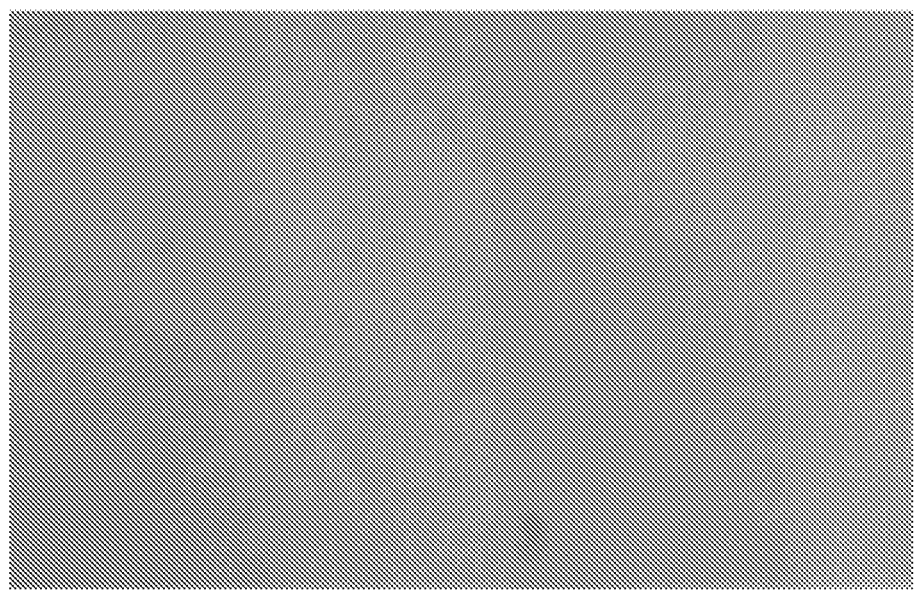
FIG. 12 shows a normal image displayed in a display area of a display panel with no flicker according to some embodiments of the present disclosure.
Figure 13:
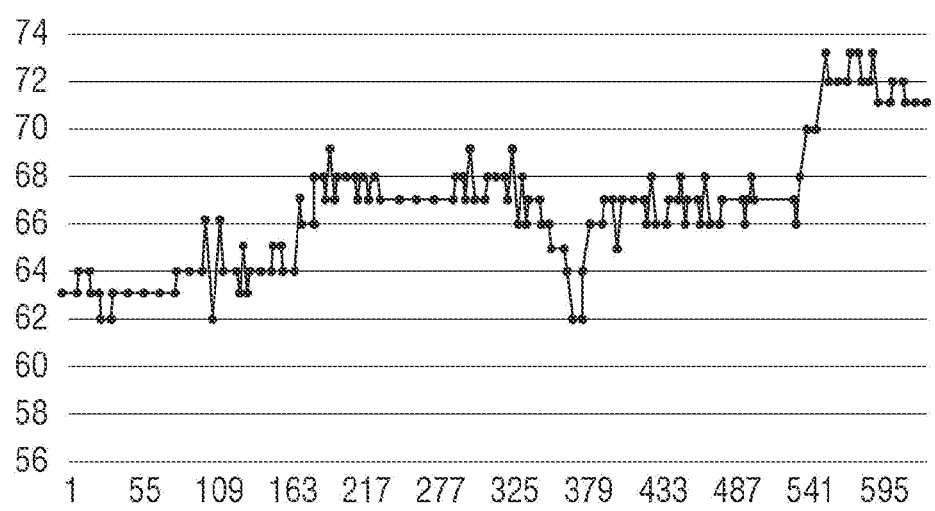
FIG. 13 is a graph showing the result of detection of flicker in a normal image with no flicker according to some embodiments of the present disclosure.

FIG. 12 shows a normal image displayed in a display area of a display panel with no flicker. FIG. 13 is a graph showing flicker detection result data corresponding to a normal image with no flicker.

Referring to FIGS. 12 and 13, the flicker detection circuit 400 generates a light-sensing profile in units of one or more frames by sampling light-sensing signals and identifies the occurrence and degree of flicker by analyzing magnitude variations in the light-sensing profile.

If the light-sensing profile is analyzed as changing gradually, rather than rapidly, within a range (e.g., a set or predefined range) over a period or area (e.g., a set or predefined period or area), as shown in FIGS. 12 and 13, the flicker detection circuit 400 may determine that a flicker phenomenon has not occurred. Accordingly, the flicker detection circuit 400 may transmit code data indicating a normal driving state where flicker has not occurred or numerical data indicating a normal flicker level to the main driving circuit 200.

Figure 14:
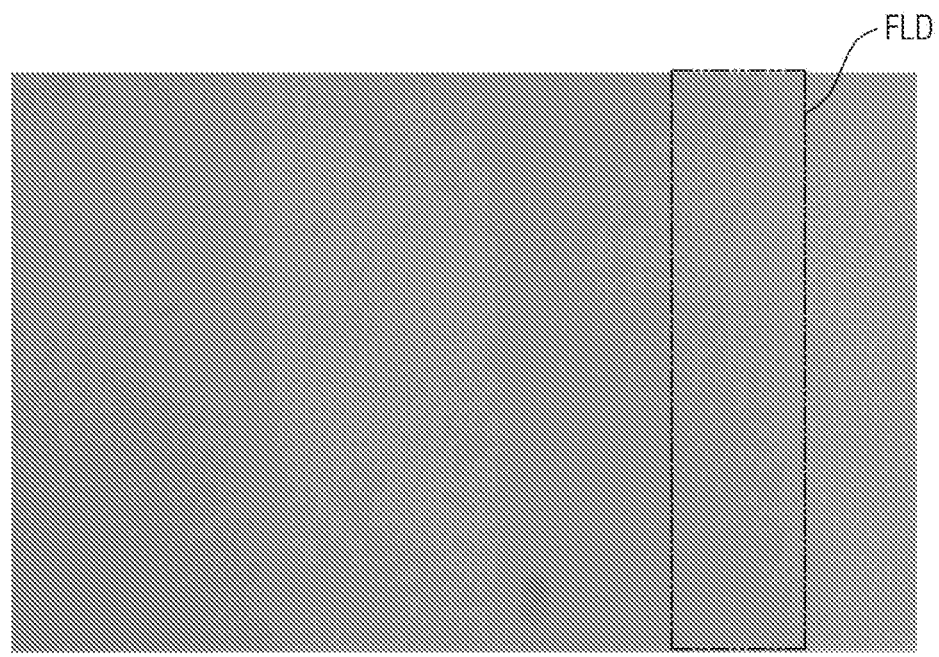
FIG. 14 shows an image displayed in a display area of a display panel with flicker according to some embodiments of the present disclosure.
Figure 15:
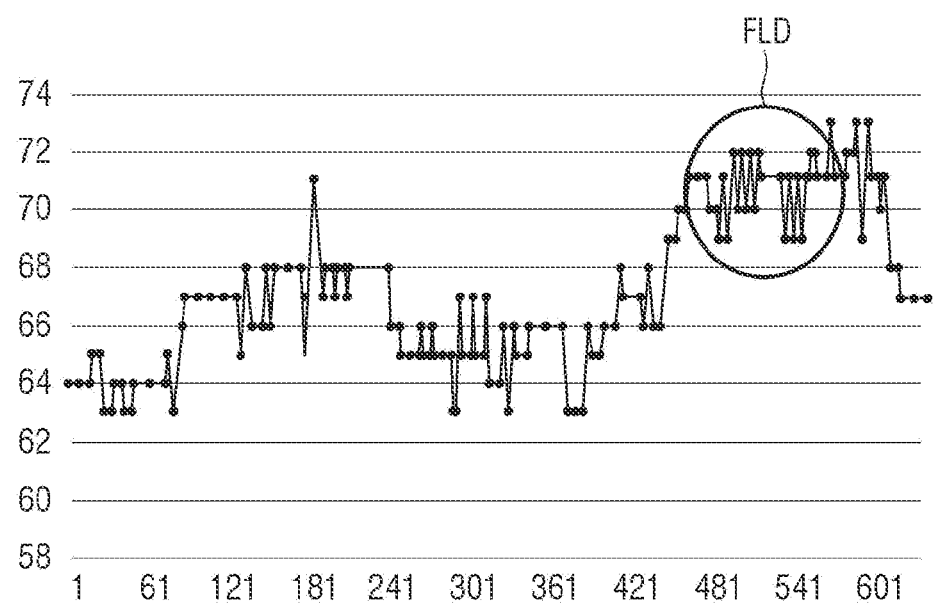
FIG. 15 is a graph showing the result of detection flicker in an image with flicker according to some embodiments of the present disclosure.

FIG. 14 shows an image displayed in a display area of a display panel with flicker. FIG. 15 is a graph showing the result of detection flicker in an image with flicker.

Referring to FIGS. 14 and 15, the flicker detection circuit 400 identifies the occurrence and degree of flicker by analyzing variations in the magnitude of light-sensing signals in a light-sensing profile generated in units of one or more frames. The flicker detection circuit 400 may determine that a flicker phenomenon has occurred if the light-sensing profile shows that the magnitude of the light-sensing signals has varied by more than a level (e.g., a set or predefined level).

For example, referring again to FIG. 11, if larger variations than a level (e.g., a set or predefined level) are detected from the light-sensing profile, particularly, from, for example, a flicker-occurred area FLD of FIG. 15, the flicker detection circuit 15 may determine that a flicker phenomenon has occurred in the flicker-occurred area FLD. Accordingly, the flicker detection circuit 400 may transmit code data indicating the occurrence of flicker, coordinate data of the flicker-occurred area FLD, and numerical data indicating the degree of flicker in the flicker-occurred area FLD to the main driving circuit 200 (SS6).

Meanwhile, the flicker detection circuit 400 may filter a light-sensing profile by comparing the light-sensing profile on a frame-by-frame basis or comparing the light-sensing profile with a reference light-sensing profile (e.g., a set or predefined reference light-sensing profile) to minimize or reduce the influence of external light applied to the light-sensing pixels LSP during the flicker measurement mode.

Figure 16:
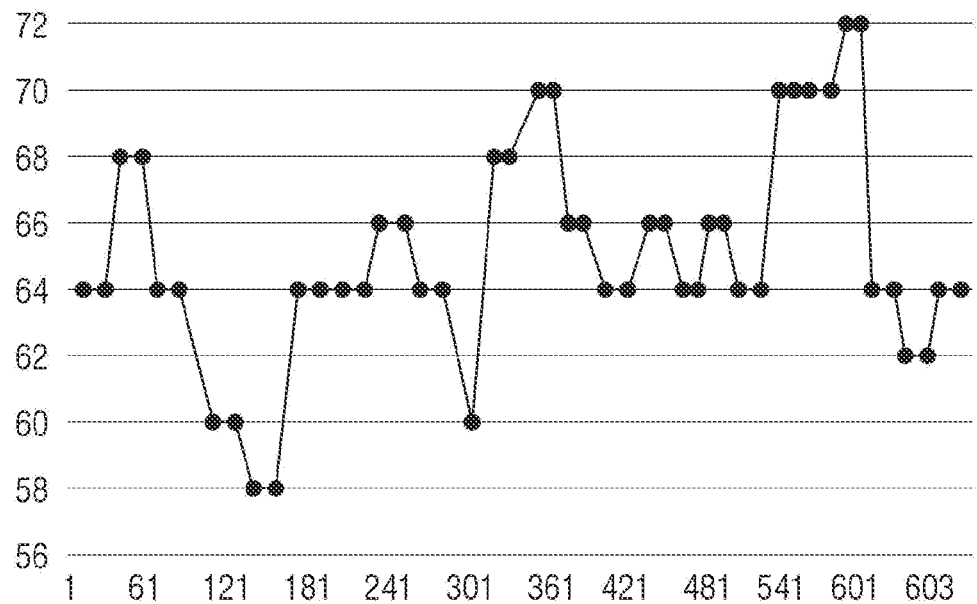
FIG. 16 is a graph showing the result of detection flicker in a test image with flicker according to some embodiments of the present disclosure.
Figure 17:
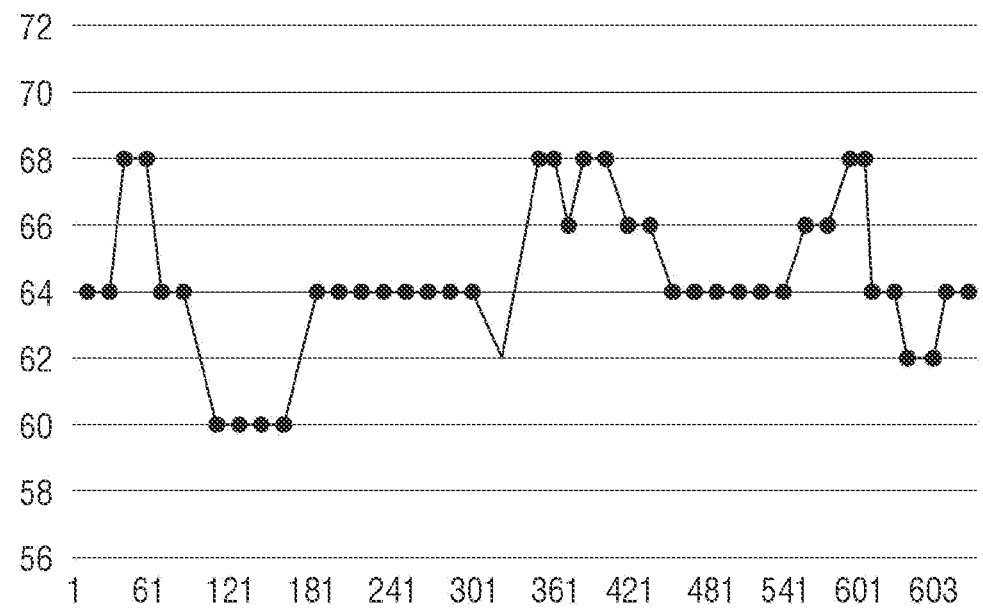
FIG. 17 is a graph showing the result of detection flicker in a test image with no flicker according to some embodiments of the present disclosure.
Figure 18:
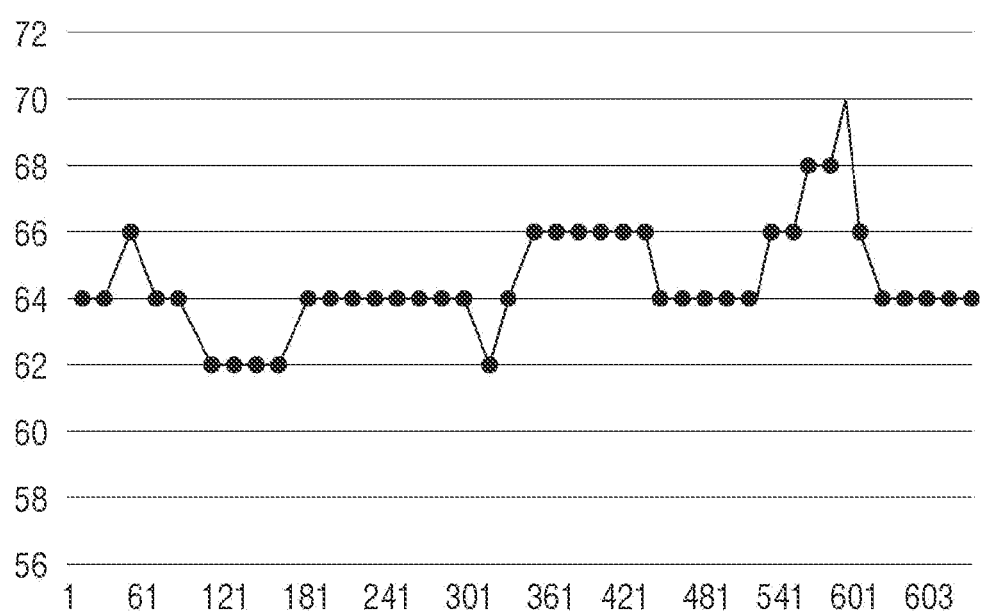
FIG. 18 is a graph showing differential data obtained from flicker detection result data and flicker non-detection result data according to some embodiments of the present disclosure.

FIG. 16 is a graph showing the result of detection flicker in a test image with flicker. FIG. 17 is a graph showing the result of detection flicker in a test image with no flicker. FIG. 18 is a graph showing differential data obtained from flicker detection result data and flicker non-detection result data.

Referring to FIGS. 16 and 17, the flicker detection circuit 400 may compare a light-sensing profile with flicker with a reference light-sensing profile (e.g., a set or predefined reference light-sensing profile) with no flicker in units of one or more frames. For example, the flicker detection circuit 400 may obtain differential data between the light-sensing profile with flicker and the reference light-sensing profile by subtracting light-sensing data of the reference light-sensing profile from light-sensing data of the light-sensing profile with flicker. The flicker detection circuit 400 may filter out the influence of external light applied to the light-sensing pixels LSP during the flicker measurement mode by using the differential data as a light-sensing profile.

Referring to FIG. 17, if larger magnitude variations than a level (e.g., a set or predefined level) are detected from light-sensing signals in a light-sensing profile from which the influence of external light has been filtered out, the flicker detection circuit 400 may determine that a flicker phenomenon has occurred. Accordingly, the flicker detection circuit 400 may transmit code data indicating the occurrence of flicker in a flicker-occurred area FLD, coordinate data of the flicker-occurred area FLD, and numerical data indicating the degree of flicker in the flicker-occurred area FLD to the main driving circuit 200.

Alternatively, the flicker detection circuit 400 may compare at least two light-sensing profiles with flicker with one another. For example, the flicker detection circuit 400 may obtain differential data between the light-sensing profiles by subtracting light-sensing data of one of the light-sensing profiles from light-sensing data of the other light-sensing profile(s). The flicker detection circuit 400 may filter out the influence of external light applied to the light-sensing pixels LSP during the flicker measurement mode by using the differential data as a light-sensing profile. Then, if light-sensing signals in a light-sensing profile from which the influence of external light has been filtered out vary by more than a level (e.g., a set or predefined level), the flicker detection circuit 400 may determine that a flicker phenomenon has occurred. Then, the flicker detection circuit 400 may transmit code data indicating that flicker has occurred, coordinate data of a flicker-occurred area FLD where the flicker has occurred, and numerical data indicating the degree of the flicker in the flicker-occurred area FLD to the main driving circuit 200.

Thereafter, referring again to FIG. 11, the main driving circuit 200 either maintains or shifts down the driving mode of the touch sensing unit TSU based on the occurrence of flicker and the result of detection of flicker (SS7).

Specifically, if code data indicating the occurrence of flicker, coordinate data of a flicker-occurred area FLD, and/or numerical data indicating the degree of flicker in the flicker-occurred area FLD are received from the flicker detection circuit 400, the main driving circuit 200 may generate a touch driving control signal shifting down the driving mode of the touch sensing unit TSU and may provide the generated touch driving control signal to the touch sensing circuit 500. For example, the main driving circuit 200 may provide a first or second driving mode control signal to the touch sensing circuit 500. Then, the touch sensing circuit 500 may drive the touch sensing unit TSU, currently being driven in the third driving mode of Table 1, in the first or second driving mode of Table 1 in response to the first or second driving mode signal from the main driving circuit 200.

Thereafter, the main driving circuit 200 may generate video data based on the code data, the coordinate data, and the numerical data received from the flicker detection circuit 400 and may display the generated video data in the display area DA (SS8).

If code data indicating a normal driving state where flicker has not occurred or numerical data indicating that flicker has occurred, but only to a normal degree are received from the flicker detection circuit 400, the main driving circuit 200 may generate a touch driving control signal either maintaining or shifting up the driving mode of the touch sensing unit TSU and may provide the generated touch driving control signal to the touch sensing circuit 500.

For example, the main driving circuit 200 may provide the third driving mode control signal to the touch sensing circuit 500. Then, the touch sensing circuit 500 may drive the touch sensing unit TSU, currently being driven in the first or second driving mode, in the third driving mode in response to the third driving mode control signal from the main driving circuit 200.

If flicker has not occurred, the main driving circuit 200 may provide a self-cap sensing (SCS) mode control signal to the touch sensing circuit 500. Then, the touch sensing circuit 500 may drive the touch sensing unit TSU, currently being driven in the first or second driving mode, in the SCS mode of Table 1 in response to the SCS mode control signal from the main driving circuit 200.

As described above, the display device 10 can change the driving mode of the touch sensing unit TSU in accordance with the result of detection of flicker with the use of the light-sensing pixels LSP in the display area DA. When flicker has not occurred, the driving mode of the touch sensing unit TSU can be maintained not to lower the touch sensing accuracy and efficiency of the touch sensing unit TSU. Also, the occurrence of flicker that may be caused by the driving characteristics of the touch sensing unit TSU can be prevented by selectively shifting down the driving mode of the touch sensing unit TSU based on the result of detection of flicker and the degree of detected flicker.

Figure 19:
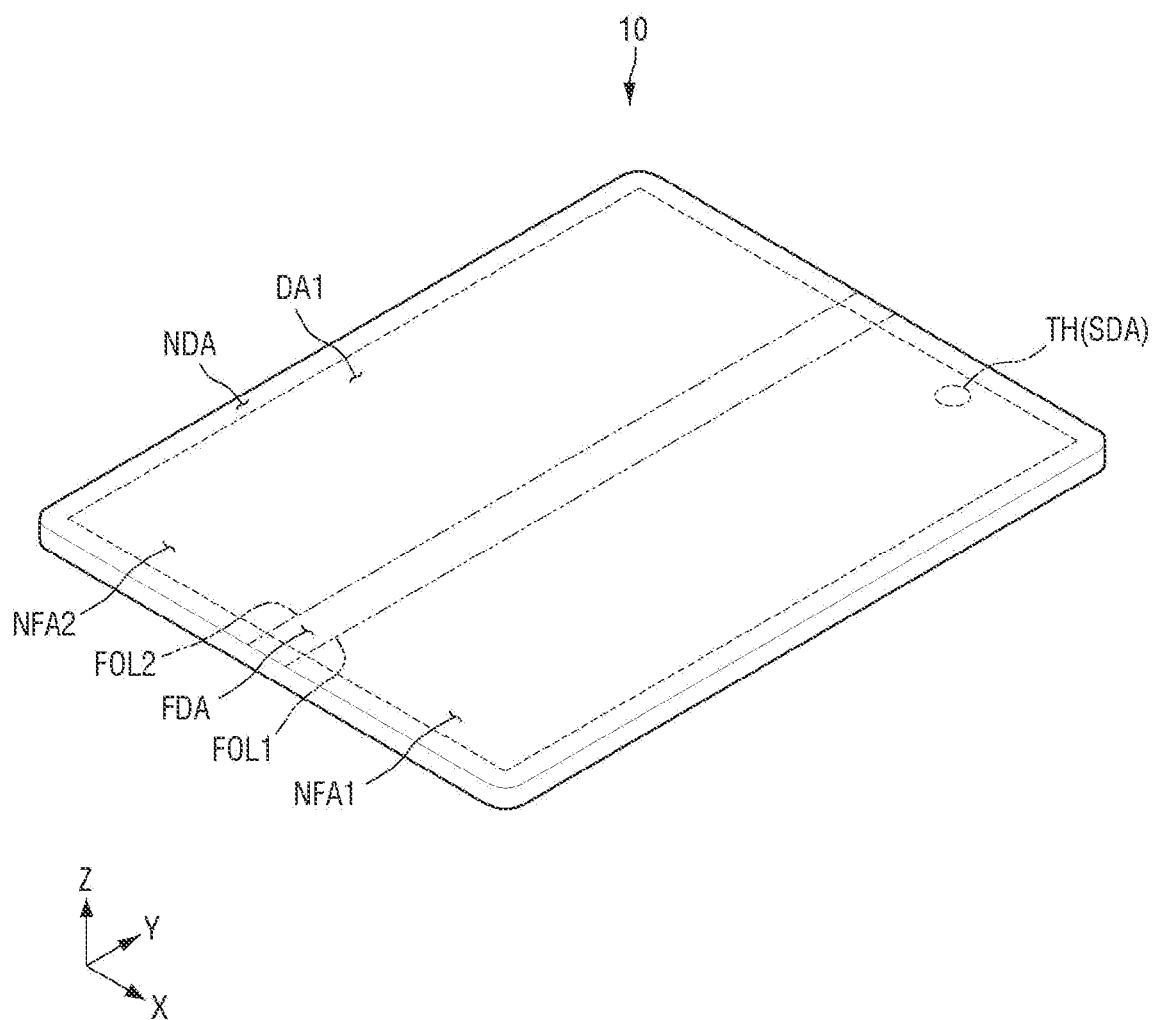
FIGS. 19 and 20 are perspective views of a display device according to some embodiments of the present disclosure.
Figure 20:
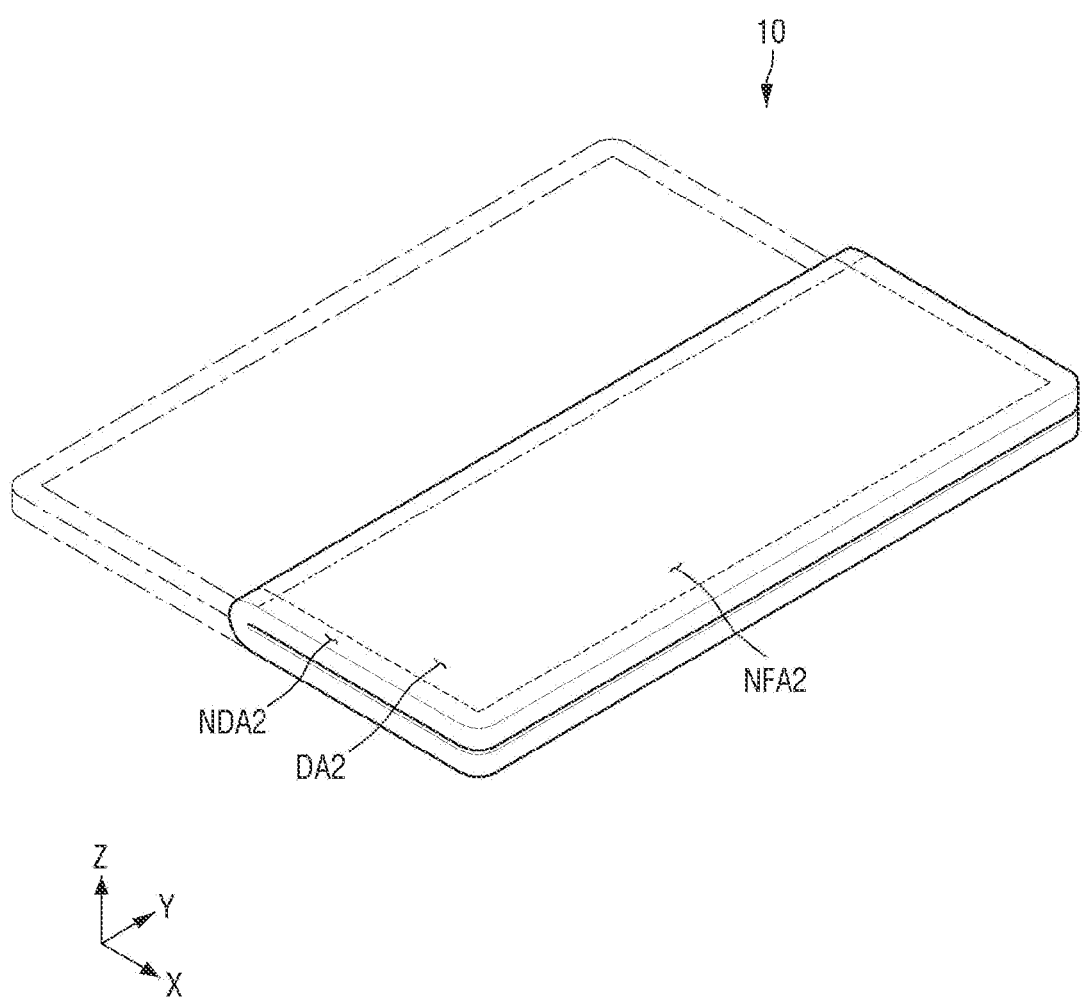

FIGS. 19 and 20 are perspective views of a display device according to some embodiments of the present disclosure.

FIGS. 19 and 20 illustrate that a display device 10 is a foldable display device that can be folded in an X-axis direction. Referring to FIGS. 19 and 20, the display device 10 may be able to maintain both a folded state and an unfolded state. The display device 10 may be folded in so that the front surface of the display device 10 may be located on the inside of the display device 10. In this case, parts of the front surface of the display device 10 may be arranged to face each other. Alternatively, the display device 10 may be folded out so that the front surface of the display device 10 may be located on the outside of the display device 10. In this case, parts of the rear surface of the display device 10 may be arranged to face each other.

A first non-folding area NFA1 may be located on one side (e.g., on the right side) of a folding area FDA. A second non-folding area NFA2 may be located on the other side (e.g., on the left side) of the folding area FDA. A touch sensing unit TSU may be formed and located in the first and second non-folding areas NFA1 and NFA2.

First and second folding lines FOL1 and FOL2 may extend in a Y-axis direction, and the display device 10 may be folded in the X-axis direction. As a result, the length, in the X-axis direction, of the display device 10 can be reduced by about half, and thus, a user can easily carry the display device 10 around.

The direction in which the first and second folding lines FOL1 and FOL2 extend is not particularly limited to the Y-axis direction. Alternatively, the first and second folding lines FOL1 and FOL2 may extend in the X-axis direction, and the display device 10 may be folded in the Y-axis direction. In this case, the length, in the Y-axis direction, of the display device 10 can be reduce by about half. Alternatively, the first and second folding lines FOL1 and FOL2 may extend in a diagonal direction of the display device 10, between the X-axis direction and the Y-axis direction. In this case, the display device 10 may be folded into a triangular shape.

In a case where the first and second folding lines FOL1 and FOL2 extend in the Y-axis direction, the length, in the X-axis direction, of the folding area FDA may be less than the length, in the Y-axis direction, of the folding area FDA. The length, in the X-axis direction, of the first non-folding area NFA1 may be greater than the length, in the X-axis direction, of the folding area FDA. The length, in the X-axis direction, of the second non-folding area NFA2 may be greater than the length, in the X-axis direction, of the folding area FDA.

A first display area DA1 may be located at the front of the display device 10. The first display area DA1 may overlap with the folding area FDA, the first non-folding area NFA1, and the second non-folding area NFA2. Thus, when the display device 10 is unfolded, an image may be displayed in the folding area FDA, the first non-folding area NFA1, and the second non-folding area NFA2 of the display device 10 in a forward direction.

A second display area DA2 may be located at the rear of the display device 10. The second display area DA2 may overlap with the second non-folding area NFA2. Thus, when the display device 10 is folded, an image may be displayed in the second non-folding area NFA2 of the display device 10 in the forward direction.

FIGS. 19 and 20 illustrate that a through hole TH where a camera SDA is formed is located in the first non-folding area NFA1, but the present disclosure is not limited thereto. The through hole TH or the camera SDA may be located in the second non-folding area NFA2 or in the folding area FDA.

Figure 21:
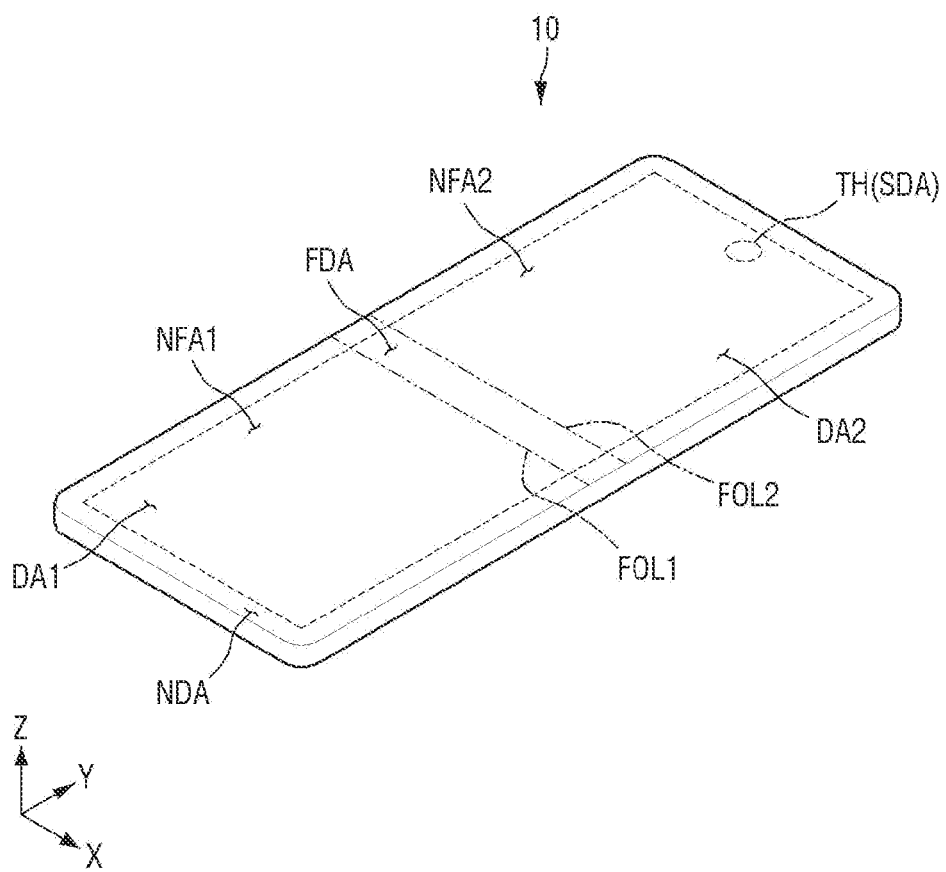
FIGS. 21 and 22 are perspective views of a display device according to some embodiments of the present disclosure.
Figure 22:
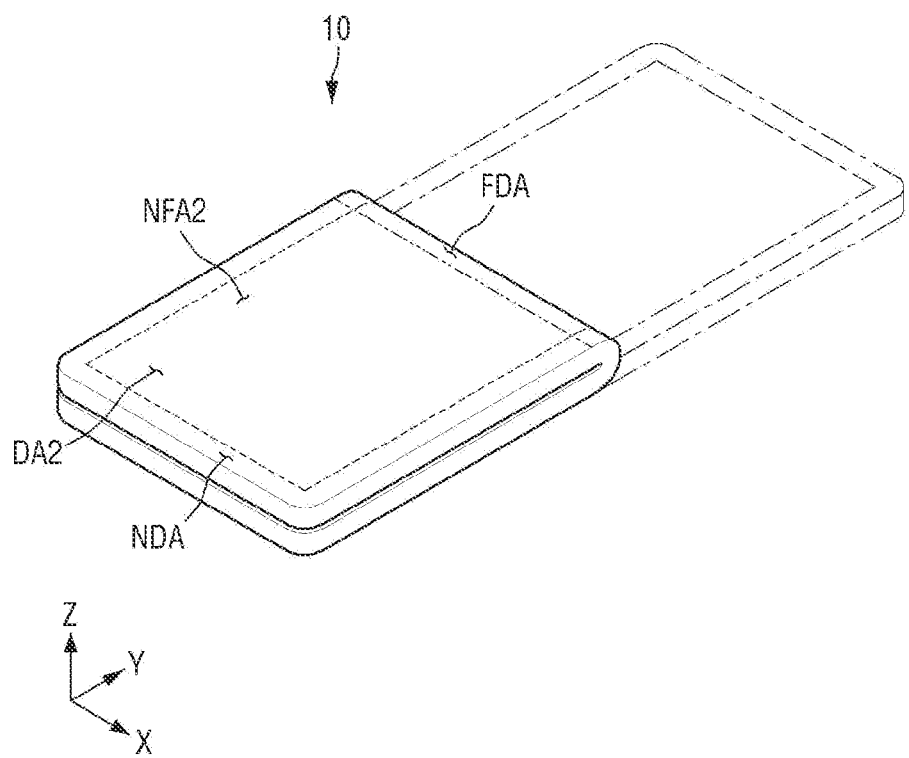

FIGS. 21 and 22 are perspective views of a display device according to some embodiments of the present disclosure.

FIGS. 21 and 22 illustrate that a display device 10 is a foldable display device that can be folded in a Y-axis direction. Referring to FIGS. 21 and 22, the display device 10 may be able to maintain both a folded state and an unfolded state. The display device 10 may be folded in so that the front surface of the display device 10 may be located on the inside of the display device 10. In this case, parts of the front surface of the display device 10 may be arranged to face each other. Alternatively, the display device 10 may be folded out so that the front surface of the display device 10 may be located on the outside of the display device 10. In this case, parts of the rear surface of the display device 10 may be arranged to face each other.

The display device 10 may include a folding area FDA, a first non-folding area NFA1, and a second non-folding area NFA2. The folding area FDA may be an area where the display device 10 is folded, and the first and second non-folding areas NFA1 and NFA2 may be areas where the display device 10 is not folded. The first non-folding area NFA1 may be located on one side (e.g., on the lower side) of the folding area FDA. The second non-folding area NFA2 may be located on the other side (e.g., on the upper side) of the folding area FDA.

A touch sensing unit TSU may be formed and located in the first and second non-folding areas NFA1 and NFA2.

The folding area FDA may be an area between first and second folding lines FOL1 and FOL2 where the display device 10 can be bent to have a curvature (e.g., a set or predetermined curvature). The first folding line FOL1 may be the boundary between the folding area FDA and the first non-folding area NFA1, and the second folding line FOL2 may be the boundary between the folding area FDA and the second non-folding area NFA2.

The first and second folding lines FOL1 and FOL2 may extend in an X-axis direction, and the display device 10 may be folded in the Y-axis direction. As a result, the length, in the Y-axis direction, of the display device 10 can be reduced by about half, and thus, a user can easily carry the display device 10 around.

The direction in which the first and second folding lines FOL1 and FOL2 extend is not particularly limited to the X-axis direction. Alternatively, the first and second folding lines FOL1 and FOL2 may extend in the Y-axis direction, and the display device 10 may be folded in the X-axis direction. In this case, the length, in the X-axis direction, of the display device 10 can be reduce by about half. Alternatively, the first and second folding lines FOL1 and FOL2 may extend in a diagonal direction of the display device 10, between the X-axis direction and the Y-axis direction. In this case, the display device 10 may be folded into a triangular shape.

In a case where the first and second folding lines FOL1 and FOL2 extend in the X-axis direction, as illustrated in FIGS. 21 and 22, the length, in the Y-axis direction, of the folding area FDA may be less than the length, in the Y-axis direction, of the folding area FDA. The length, in the Y-axis direction, of the first non-folding area NFA1 may be greater than the length, in the Y-axis direction, of the folding area FDA. The length, in the Y-axis direction, of the second non-folding area NFA2 may be greater than the length, in the Y-axis direction, of the folding area FDA.

A first display area DA1 may be located at the front of the display device 10. The first display area DA1 may overlap with the folding area FDA, the first non-folding area NFA1, and the second non-folding area NFA2. Thus, when the display device 10 is unfolded, an image may be displayed in the folding area FDA, the first non-folding area NFA1, and the second non-folding area NFA2 of the display device 10 in a forward direction.

A second display area DA2 may be located at the rear of the display device 10. The second display area DA2 may overlap with the second non-folding area NFA2. Thus, when the display device 10 is folded, an image may be displayed in the second non-folding area NFA2 of the display device 10 in the forward direction.

FIGS. 21 and 22 illustrate that a through hole TH where a camera SDA is formed is located in the second non-folding area NFA2, but the present disclosure is not limited thereto. The through hole TH or the camera SDA may be located in the first non-folding area NFA1 or in the folding area FDA.

In concluding the detailed description, those skilled in the art will appreciate that many variations and modifications can be made to the example embodiments without substantially departing from the principles of the present invention. Therefore, the disclosed example embodiments of the invention are used in a generic and descriptive sense only and not for purposes of limitation.

What is claimed is:

1. A display device comprising:
  display pixels in a display area of a display panel;
  light-sensing pixels alternately arranged with the display pixels in the display area and configured to sense light reflected from an object above the display pixels;
  a display scan driver configured to sequentially provide display scan signals to the display pixels through display scan lines;
  a flicker detection circuit configured to detect an occurrence of flicker in the display area by using light-sensing signals received from the light-sensing pixels;
  a touch sensing circuit configured to detect a touch from a user and coordinate data of a location of the touch via touch electrodes of a touch sensor; and
  a main driving circuit configured to maintain or change a driving mode of the touch sensor in units of at least one frame based on a flicker detection result and a flicker degree analysis result from the flicker detection circuit.

2. The display device of claim 1, wherein
the display pixels include light-emitting elements and pixel drivers, which are connected to the light-emitting elements,
the light-sensing pixels include light-sensing elements and sensing drivers, which are connected to the light-sensing elements, and
the sensing drivers are configured to receive the display scan signals at a same time through the display scan lines and to output the light-sensing signals to the flicker detection circuit in accordance with the display scan signals.

3. The display device of claim 1, wherein
the display pixels include light-emitting elements and pixel drivers, which are connected to the light-emitting elements,
the light-sensing pixels include light-sensing elements and sensing drivers, which are connected to the light-sensing elements, and
the sensing drivers are configured to be reset in response to sensing reset signals input thereto from a light-sensing scan driver through sensing reset lines, and to output the light-sensing signals to the flicker detection circuit in response to sensing scan signals input thereto from the light-sensing scan driver.

4. The display device of claim 1, wherein red, green, and blue display pixels and one sensing pixel form a unit pixel in the display area and are alternately arranged in first and second directions in a horizontal or vertical stripe fashion.

5. The display device of claim 1, wherein
the main driving circuit is configured to be switched to a flicker measurement mode through application control or programming control, and
in the flicker measurement mode, the main driving circuit is configured to control the driving of the display scan driver such that predefined data voltages are supplied to the display pixels for a detection of flicker, and to provide a touch driving control signal to the touch sensing circuit such that the touch sensor is switched to a flicker detection mode.

6. The display device of claim 5, wherein
the flicker detection circuit is configured to detect a light-sensing profile and a degree of flicker by analyzing light-sensing signals output from the light-sensing pixels, and
the main driving circuit is configured to maintain or shift down the driving mode of the touch sensor depending on the degree of flicker, detected by the flicker detection circuit.

7. The display device of claim 6, wherein the flicker detection circuit is configured to generate the light-sensing profile in units of the at least one frame by sampling the light-sensing signals and converting the sampled light-sensing signals, and to filter the light-sensing profile by comparing the light-sensing profile in units of the at least one frame or comparing the light-sensing profile with a predefined reference light-sensing profile.

8. The display device of claim 1, wherein
in response to being switched to a flicker measurement mode, the main driving circuit is configured to determine whether a moving or still image is being displayed by identifying digital video data regarding an image currently being displayed, and
in response to a determination being made that a moving image is being displayed in the display area, the main driving circuit is configured to generate a gate control signal by lowering a frame driving frequency for displaying an image, to provide the gate control signal to the display scan driver, and to provide a touch driving control signal to the touch sensing circuit such that the touch sensor is switched to a flicker detection mode.

9. The display device of claim 8, wherein in response to a touch driving control signal corresponding to the flicker detection mode being input from the main driving circuit, the touch sensing circuit is configured to lower the frame driving frequency from a first frequency to a second frequency to a third frequency in units of a predefined number of frames, to change a magnitude of a driving voltage to be applied to driving electrodes of the touch sensor, and to supply the driving voltage.

10. The display device of claim 8, wherein the flicker detection circuit is configured to generate a light-sensing profile in units of the at least one frame by sampling light-sensing signals input thereto in the flicker measurement mode and to convert the sampled light-sensing signals into digital signals, to filter the light-sensing profile by comparing the light-sensing profile on a frame-by-frame basis, and to transmit data including a location and a degree of flicker to the main driving circuit through an analysis of variations in a magnitude of the light-sensing signals in the filtered light-sensing profile.

11. The display device of claim 8, wherein the flicker detection circuit is configured to obtain differential data by subtracting light-sensing data of a reference light-sensing profile from light-sensing data of light-sensing signals with flicker, and to set the differential data as a light-sensing profile.

12. The display device of claim 11, wherein in response to light-sensing signals in the light-sensing profile varying by more than a predefined level, the flicker detection circuit is configured to determine that a flicker phenomenon has occurred at a corresponding location or line area, and to transmit code data indicating that flicker has occurred, coordinate data of a flicker-occurred area where the flicker has occurred, and numerical data indicating a degree of the flicker in the flicker-occurred area to the main driving circuit.

13. The display device of claim 8, wherein the flicker detection circuit is configured to generate a light-sensing profile in units of the at least one frame by sampling light-sensing signals input thereto in the flicker measurement mode and converting the sampled light-sensing signals into digital signals, to filter the light-sensing profile by comparing the light-sensing profile with a predefined reference light-sensing profile, and to transmit data including a location and a degree of flicker to the main driving circuit through an analysis of variations in a magnitude of the light-sensing signals in the filtered light-sensing profile.

14. The display device of claim 13, wherein in response to light-sensing signals in the light-sensing profile varying by more than a predefined level, the flicker detection circuit is configured to determine that a flicker phenomenon has occurred at a corresponding location or line area, and to transmit code data indicating that flicker has occurred, coordinate data of a flicker-occurred area where the flicker has occurred, and numerical data indicating a degree of the flicker in the flicker-occurred area to the main driving circuit.

15. The display device of claim 8, wherein the flicker detection circuit is configured to obtain differential data between a plurality of light-sensing profiles with flicker by comparing and analyzing at least two of the plurality of light-sensing profiles, and to set the differential data as a light-sensing profile.

16. The display device of claim 8, wherein the flicker detection circuit is configured to obtain differential data between a plurality of light-sensing profiles of a plurality of frames with flicker by subtracting light-sensing data of a light-sensing profile of one of the plurality of frames from light-sensing data of a light-sensing profile of another one of the plurality of frames, and to set the differential data as a light-sensing profile.

17. The display device of claim 16, wherein in response to light-sensing signals in a light-sensing profile varying by more than a predefined level, the flicker detection circuit is configured to determine that a flicker phenomenon has occurred at a corresponding location or line area, and to transmit code data indicating that flicker has occurred, coordinate data of a flicker-occurred area where the flicker has occurred, and numerical data indicating a degree of the flicker in the flicker-occurred area to the main driving circuit.

18. The display device of claim 17, wherein in response to the code data indicating that flicker has occurred, the coordinate data of the flicker-occurred area where the flicker has occurred, and the numerical data indicating the degree of the flicker in the flicker-occurred area being received, the main driving circuit is configured to generate a touch driving control signal shifting down the driving mode of the touch sensor, and to provide the generated touch driving control signal to the touch sensing circuit.

19. The display device of claim 17, wherein in response to code data indicating that flicker has not occurred or numerical data indicating that flicker has occurred, but only to a normal degree, being received from the flicker detection circuit, the main driving circuit is configured to generate a touch driving control signal either maintaining or shifting up the driving mode of the touch sensor, and to provide the generated touch driving control signal to the touch sensing circuit.

20. An electronic device including a display device, wherein the display device comprises:
  display pixels in a display area of a display panel;
  light-sensing pixels alternately arranged with the display pixels in the display area and configured to sense light reflected from an object above the display pixels;
  a display scan driver configured to sequentially provide display scan signals to the display pixels through display scan lines;
  a flicker detection circuit configured to detect an occurrence of flicker in the display area by using light-sensing signals received from the light-sensing pixels;
  a touch sensing circuit configured to detect a touch from a user and coordinate data of a location of the touch via touch electrodes of a touch sensor; and
  a main driving circuit configured to maintain or change a driving mode of the touch sensor in units of at least one frame based on a flicker detection result and a flicker degree analysis result from the flicker detection circuit.

\* \* \* \* \*